United States Patent
Won et al.

(10) Patent No.: US 10,645,623 B2
(45) Date of Patent: May 5, 2020

(54) METHOD AND APPARATUS FOR PROVIDING CONGESTION CONTROL FOR APPLICATION IN WIRELESS COMMUNICATION SYSTEM

(71) Applicant: Samsung Electronics Co., Ltd., Suwon-si, Gyeonggi-do (KR)

(72) Inventors: Sung Hwan Won, Seoul (KR); Sunghoon Kim, Suwon-si (KR); Songyean Cho, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/935,727

(22) Filed: Mar. 26, 2018

(65) Prior Publication Data

US 2018/0220346 A1    Aug. 2, 2018

Related U.S. Application Data

(63) Continuation of application No. 15/058,794, filed on Mar. 2, 2016, now Pat. No. 9,930,591.

(Continued)

(51) Int. Cl.
*H04W 36/12* (2009.01)
*H04W 36/00* (2009.01)
(Continued)

(52) U.S. Cl.
CPC ............. *H04W 36/12* (2013.01); *H04L 67/12* (2013.01); *H04W 8/065* (2013.01); *H04W 28/02* (2013.01);
(Continued)

(58) Field of Classification Search
CPC . H04W 48/06; H04W 88/02; H04W 28/0289; H04W 28/02; H04W 48/16;
(Continued)

(56) References Cited

U.S. PATENT DOCUMENTS 8,750,179 B2   6/2014   Purnadi et al.
2005/0024553 A1   2/2005   Fukuta et al.
(Continued)

FOREIGN PATENT DOCUMENTS

KR   10-2015-0113777 A   10/2015
WO   2010/026287 A1   3/2010
(Continued)

OTHER PUBLICATIONS

3GPP; 3rd Generation Partnership Project; Technical Specification Group Services and System Aspects; Study on extended architecture support for proximity-based services (Release 13); 3GPP TR 23.713; V1.5.0; Technical Report; France; May 6, 2010.

(Continued)

*Primary Examiner* — Allahyar Kasraian
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

Methods and apparatuses provide a service to user equipment through a dedicated core network. In one method, a base station, also referred to as eNB, receives a non-access stratum (NAS) message from user equipment (UE), and transmits a first initial UE message having the NAS message to a first mobility management entity (MME). Also, the base station receives a redirection request message having the NAS message from the first MME, and transmits a second (Continued)

initial UE message having the NAS message to a second MME. In another method, the MME receives the first initial UE message having the NAS message from the base station, and transmits the redirection request message having the NAS message when the MME fails to support a dedicated core network according to UE usage type information. If the redirection request message is transmitted, a second initial UE message having the NAS message is transmitted to a dedicated MME.

12 Claims, 23 Drawing Sheets

Related U.S. Application Data

(60) Provisional application No. 62/126,917, filed on Mar. 2, 2015, provisional application No. 62/202,406, filed on Aug. 7, 2015, provisional application No. 62/232,100, filed on Sep. 24, 2015.

(51) Int. Cl.
| | |
|---|---|
| *H04W 8/06* | (2009.01) |
| *H04W 48/02* | (2009.01) |
| *H04W 48/06* | (2009.01) |
| *H04W 28/02* | (2009.01) |
| *H04L 29/08* | (2006.01) |
| *H04W 4/06* | (2009.01) |
| *H04W 48/16* | (2009.01) |

(52) U.S. Cl.
CPC ........ *H04W 36/0011* (2013.01); *H04W 48/02* (2013.01); *H04W 48/06* (2013.01); *H04W 4/06* (2013.01); *H04W 48/16* (2013.01)

(58) Field of Classification Search
CPC . H04W 48/02; H04W 28/0284; H04W 28/08; H04W 48/08; H04W 28/0231; H04W 28/0247
See application file for complete search history.

(56) References Cited

U.S. PATENT DOCUMENTS

| | | |
|---|---|---|
| 2010/0268763 A1 | 10/2010 | Rasanen |
| 2012/0327947 A1 | 12/2012 | Cai et al. |
| 2013/0044668 A1 | 2/2013 | Purnadi et al. |
| 2013/0083773 A1* | 4/2013 | Watfa ................ H04W 36/0033 370/331 |
| 2014/0016537 A1 | 1/2014 | Khobare et al. |
| 2015/0029866 A1 | 1/2015 | Liao et al. |
| 2015/0085664 A1 | 3/2015 | Sachdev et al. |
| 2015/0282017 A1 | 10/2015 | Wang et al. |
| 2015/0295826 A1 | 10/2015 | Sitharaman et al. |
| 2016/0050601 A1 | 2/2016 | Jeong et al. |
| 2016/0066259 A1* | 3/2016 | Guo ..................... H04W 76/10 370/230 |
| 2016/0192232 A1 | 6/2016 | Sachdev et al. |
| 2016/0204847 A1 | 7/2016 | Ryu et al. |
| 2016/0227385 A1 | 8/2016 | Ahmad et al. |
| 2016/0381491 A1 | 12/2016 | Watfa et al. |
| 2017/0013501 A1* | 1/2017 | Kim ..................... H04W 28/02 |
| 2017/0111280 A1 | 4/2017 | Zhang et al. |
| 2017/0251396 A1 | 8/2017 | Centonza et al. |
| 2018/0027479 A1* | 1/2018 | Ahmad ................ H04W 48/06 370/235 |
| 2018/0234942 A1 | 8/2018 | Kim et al. |
| 2018/0248919 A1 | 8/2018 | Gustafsson et al. |

FOREIGN PATENT DOCUMENTS

| | | |
|---|---|---|
| WO | 2015/026111 A1 | 2/2015 |
| WO | 2015-038438 A1 | 3/2015 |
| WO | 2015/119427 A1 | 8/2015 |
| WO | 2016/072814 A1 | 5/2016 |

OTHER PUBLICATIONS

LG Electronics; Clarification on TMGI advertisement procedure and resolving the related FFS; SA WG2 Temporary Document; SA WG2 Meeting #109; S2-151612; May 25-29, 2015; Fukuoka, Japan.
Qualcomm Incorporated et al.; TMGI and ECGI advertisement; TSG SA Temporary Document; SA WG2 Meeting #109; S2-151794; (was S2-151476); May 25-29, 2015; Fukuoka, Japan.
Ericsson; Evaluation of DECOR solutions; SA WG2 Temporary Document; SA WG2 Meeting #S2#106; S2-143947; Nov. 17-21, 2014; San Francisco, CA.
NEC; Update to Mmegiinri for dedicated networks re-selection solution; 3GPP TSG SA2 Meeting #106; S2-144068; Nov. 17-21, 2014; San Francisco, CA.
Intel; Resolving Editors Notes for MME triggered re-direction to dedicated MME solution; SA WG2 Temporary Document; SA WG2 Meeting #106; S2-144156; Nov. 17-21, 2014; San Francisco, CA.
3GPP; 3rd Generation Partnership Project; Technical Specification Group Services and System Aspects; Architecture Enhancements for Dedicated Core Networks; Stage 2 (Release 13); 3GPP TR 23.707; V13.0.0; Dec. 2014.
3GPP; "3rd Generation Partnership Project; Technical Specification Group Services and System Aspects; Study on extended architecture support for proximity-based services (Release 13)"; Jul. 2015; pp. 1-83; 3GPP TR 23.713 V1.5.0; France.
U.S. Office Action dated Mar. 29, 2019; Corresponding U.S. Appl. No. 15/763,386.
Office Action dated Jun. 14, 2019; Corresponding U.S. Appl. No. 16/298,920.

* cited by examiner

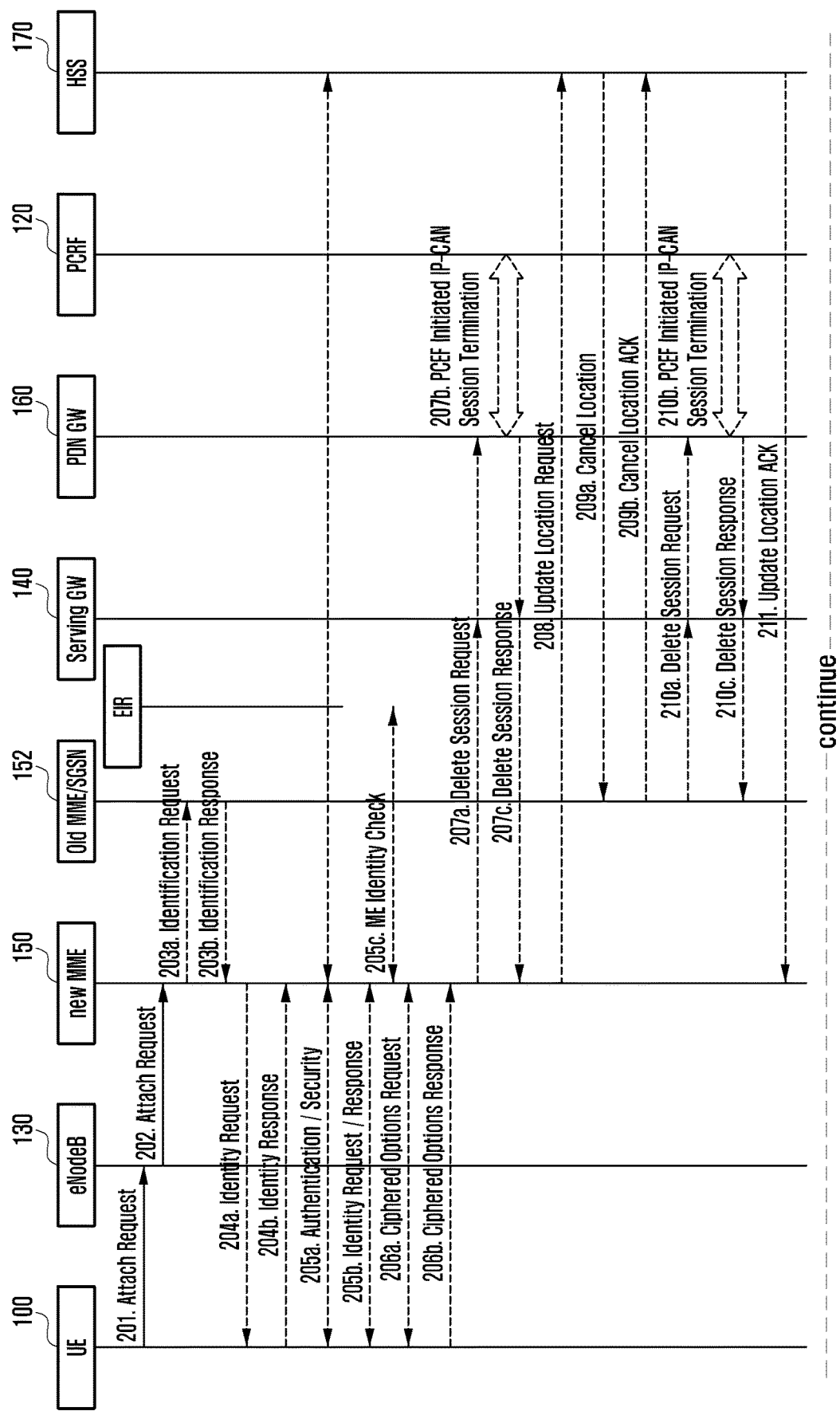

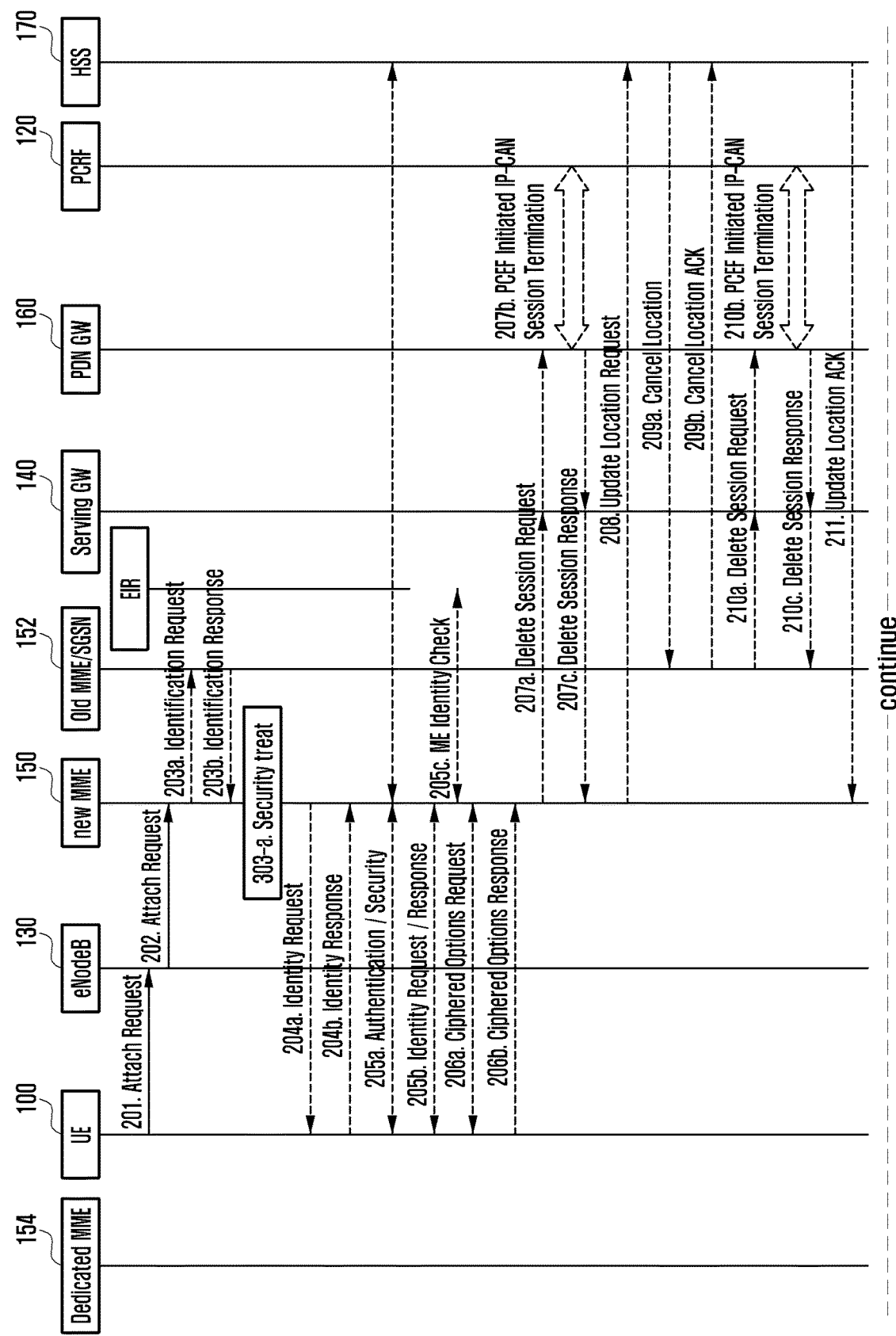

FIG. 16A
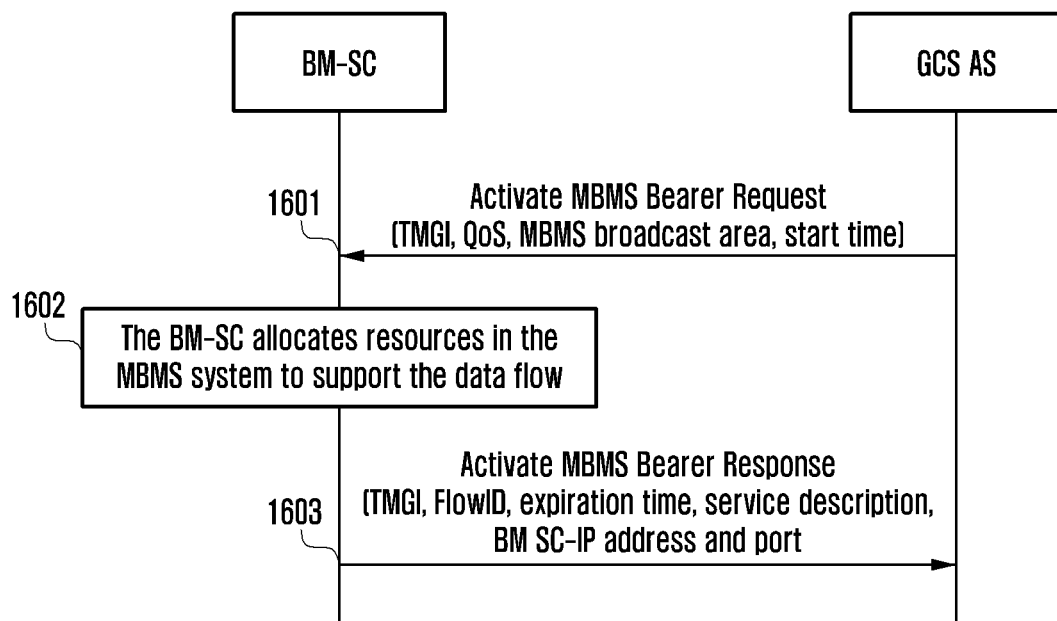
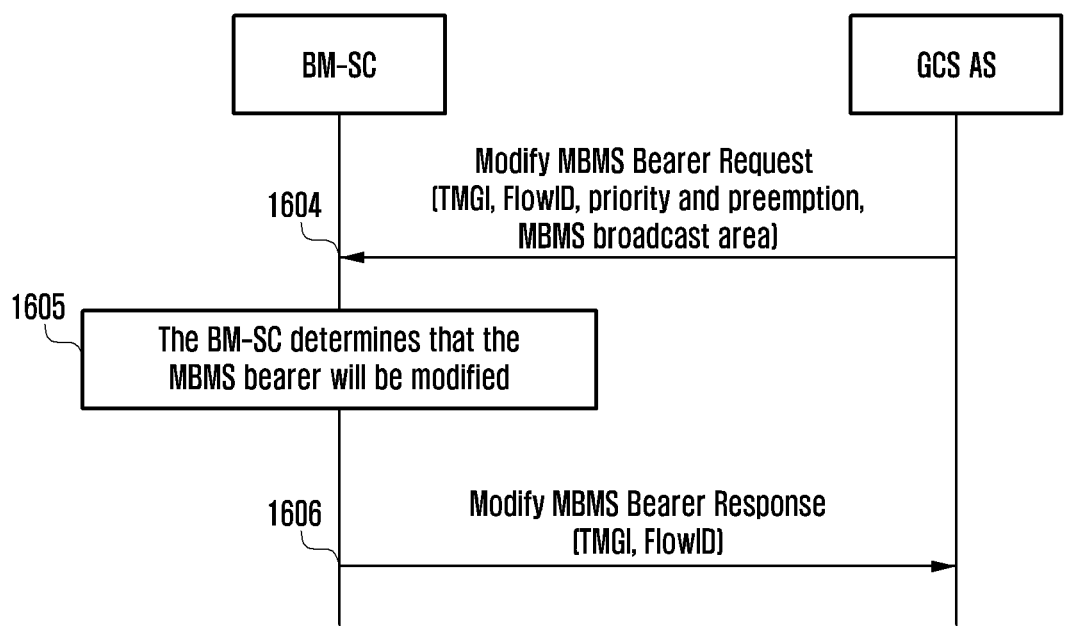

METHOD AND APPARATUS FOR PROVIDING CONGESTION CONTROL FOR APPLICATION IN WIRELESS COMMUNICATION SYSTEM

CROSS-REFERENCE TO RELATED APPLICATIONS

This application is a continuation application of prior application Ser. No. 15/058,794 filed on Mar. 2, 2016 and was based on and claimed priority under 35 U.S.C. § 119(e) of U.S. Provisional application Nos. 62/126,917 filed on Mar. 2, 2015, 62/202,406 filed on Aug. 7, 2015 and 62/232,100 filed on Sep. 24, 2015 in the U.S. patent and trademark office, the entire disclosure of which is hereby incorporated by reference.

TECHNICAL FIELD

The present invention relates to a wireless communication system and, more particularly, to a method and apparatus for providing a service to user equipment through a dedicated core network.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, a terminal (also referred to as user equipment (UE) or the like) should be offered a service through a suitable core network (CN) for providing that service. This suitable core network may be referred to as a dedicated core network (DCN). Therefore, when a non-access stratum (NAS) message is received from a terminal, a base station (also referred to as evolved node B (eNodeB or eNB) or the like) should transmit the NAS message to a mobility management entity (MME) contained in the DCN so that the terminal can be offered a service through the DCN. However, if any MME selected by the base station is not a dedicated MME which is contained in the DCN, the base station is required to select an MME again.

SUMMARY

In order to meet the above-mentioned need or the like, the present invention provides a method and apparatus for allowing a base station to transmit an NAS message to a dedicated MME through rerouting of the NAS message when an MME receiving the NAS message is not the dedicated MME.

According to various embodiments of the present invention, a method implemented at a base station in a wireless communication system includes steps of receiving a non-access stratum (NAS) message from user equipment (UE); transmitting a first initial UE message having the NAS message to a first mobility management entity (MME); receiving a redirection request message having the NAS message from the first MME; and transmitting a second initial UE message having the NAS message to a second MME.

According to various embodiments of the present invention, a base station in a wireless communication system includes a communication unit configured to perform communication with other network entity; and a control unit configured to control the communication unit to receive a non-access stratum (NAS) message from user equipment (UE), to transmit a first initial UE message having the NAS message to a first mobility management entity (MME), to receive a redirection request message having the NAS message from the first MME, and to transmit a second initial UE message having the NAS message to a second MME.

According to various embodiments of the present invention, a method implemented at a mobility management entity (MME) in a wireless communication system includes steps of receiving a first initial user equipment (UE) message having a non-access stratum (NAS) message from a base station; and transmitting a redirection request message having the NAS message when the MME fails to support a dedicated core network according to UE usage type information, wherein if the redirection request message is transmitted, a second initial UE message having the NAS message is transmitted to a dedicated MME.

According to various embodiments of the present invention, a mobility management entity (MME) in a wireless communication system includes a communication unit configured to perform communication with other network entity; and a control unit configured to control the communication unit to receive a first initial user equipment (UE) message having a non-access stratum (NAS) message from a base station, and to transmit a redirection request message having the NAS message when the MME fails to support a dedicated core network according to UE usage type information, wherein if the redirection request message is transmitted, a second initial UE message having the NAS message is transmitted to a dedicated MME.

BRIEF DESCRIPTION OF THE DRAWINGS

FIGS. 2A and 2B are flow diagrams illustrating a procedure in which UE registers with a network.

FIG. 3A is a flow diagram illustrating an attach process of UE according to the first embodiment of the present invention.

FIG. 16A and FIG. 16B are flow diagrams illustrating a method for providing an MBMS service according to the third embodiment of the present invention.

DETAILED DESCRIPTION

Figure 1:
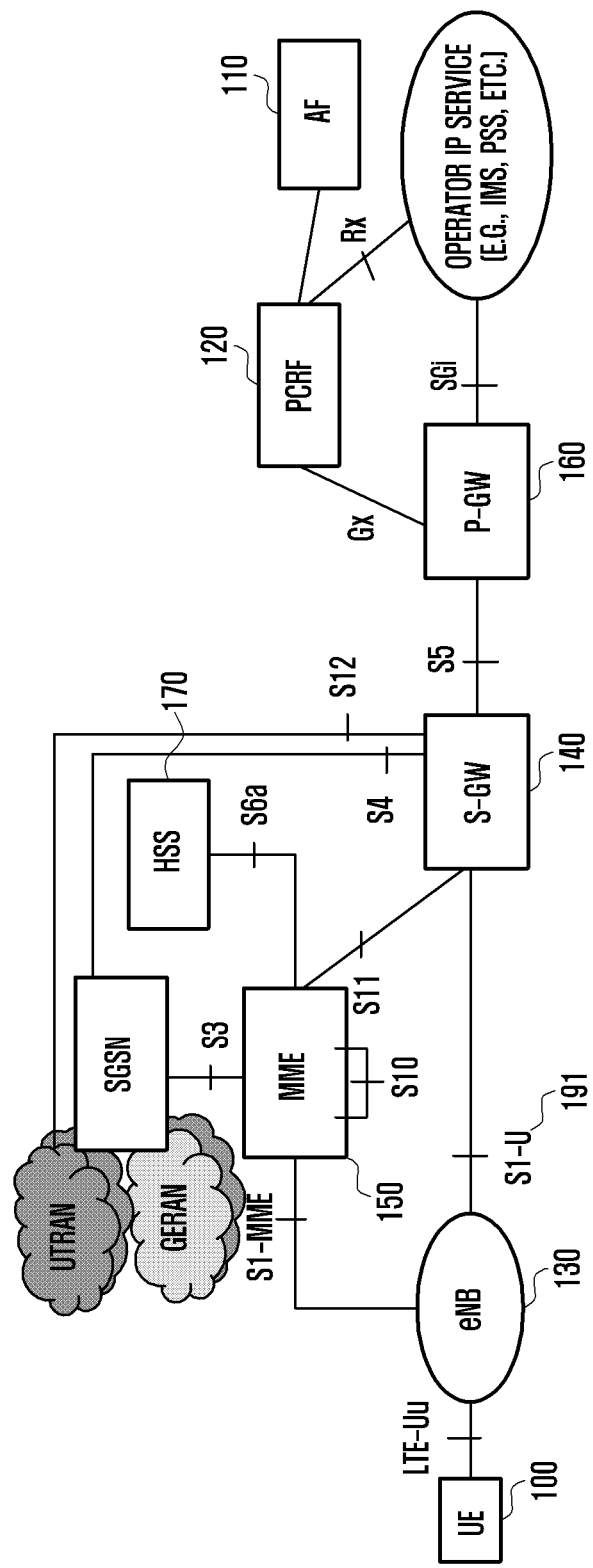
FIG. 1 is a diagram illustrating the structure of a communication system according to an embodiment of the present invention.

Hereinafter, embodiments of the present invention will be described with reference to the accompanying drawings. Through the drawings, the same or similar reference numerals denote corresponding features consistently. Additionally, well known functions and configurations may not be described or illustrated in detail to avoid obscuring the subject matter of the present invention.

Also, embodiments of the present invention will be described hereinafter by mainly targeting Long-Term Evolution (LTE) and Evolved Packet Core (EPC), which are a Radio Access Network (RAN) and a Core Network (CN) defined as standards by the 3rd Generation Partnership Project (3GPP), the essential concept of this invention may be favorably applied to any other communication system having a similar technical background without departing from the scope of this invention as will be apparent to those skilled in the art.

The present invention may be embodied in many different forms without changing technical subject matters and essential features as will be understood by those skilled in the art. Therefore, embodiments set forth herein are exemplary only and not to be construed as a limitation.

In embodiments, all steps and messages are not a target for selective implementation or omission. Additionally, in each embodiment, steps may not be always performed in the order described and may be changed in order. Similarly, delivery of messages may not be always performed in the order described and may be changed in order. Each step and messaging may be performed independently.

The whole or parts of exemplary contents in embodiments are provided to promote understanding by showing a detailed embodiment of this invention. Therefore, the detailed contents may be regarded as expressing a part of method and apparatus proposed by this invention. Namely, with regard to such contents, a syntax-based approach may be more desirable than a semantics-based approach. While this disclosure has been particularly shown and described with reference to an exemplary embodiment thereof, it will be understood by those skilled in the art that various changes in form and details may be made therein without departing from the spirit and scope of this disclosure as defined by the appended claims.

The present invention may be embodied in many different forms and should not be construed as limited to the embodiments set forth herein. Rather, the disclosed embodiments are provided so that this disclosure will be thorough and complete, and will fully convey the scope of this invention to those skilled in the art. The principles and features of the present invention may be employed in varied and numerous embodiments without departing from the scope of the invention.

The terms used in the present disclosure are only used to describe specific various embodiments, and are not intended to limit the present disclosure. As used herein, the singular forms are intended to include the plural forms as well, unless the context clearly indicates otherwise.

It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which are executed via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions specified in the flowchart block or blocks.

And each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

The term "unit", as used herein, may refer to a software or hardware component or device, such as a Field Programmable Gate Array (FPGA) or Application Specific Integrated Circuit (ASIC), which performs certain tasks. A unit may be configured to reside on an addressable storage medium and configured to execute on one or more processors. Thus, a module or unit may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules/units may be combined into fewer components and modules/units or further separated into additional components and modules.

First Embodiment

FIG. 1 is a diagram illustrating the structure of a communication system according to an embodiment of the present invention. According to this embodiment, the communication system may be an LTE-based mobile communication system.

Referring to FIG. 1, as shown, a wireless access network of the LTE mobile communication system may be formed of an evolved Node B (also referred to as eNB, a base station, E-UTRAN, etc.) 130, a mobility management entity (MME) 150, and a serving gateway (S-GW) 140.

User equipment (also referred to as UE, a terminal, etc.) 100 may access an external network through the eNB 130, the S-GW 140, and a PDN gateway (P-GW) 160. In order to transmit or receive data through the P-GW, the UE should create a PDN connection, which may include at least one EPS bearer.

An application function (AF) 110 is an apparatus that exchanges application-related information with a user at the level of application.

A policy charging and rules function (PCRF) 120 is an apparatus that controls a policy associated with user's quality of service (QoS). A policy and charging control (PCC) rule corresponding to the above policy is delivered and applied to the P-GW 160.

The eNB 130 is a radio access network (RAN) node and corresponds to RNC of a UTRAN system and to BSC of a GERAN system. The eNB 130 is connected to the UE 100 in a radio channel and performs a role similar to that of the existing RNC/BSC.

Since all user traffics including real-time services such as a voice over internet protocol (VoIP) are offered through a shared channel in LTE, an apparatus for collecting status information of UEs 100 and performing scheduling is needed. The eNB 130 is in charge of this.

The S-GW 140 is an apparatus that offers a data bearer, and creates or removes the data bearer under the control of the MME 150.

The MME 150 is an apparatus that performs various control functions, and a single MME 150 may be connected with a plurality of eNBs. In this invention, a certain MME newly accessed by the UE 100 is referred to as a new MME 150. Also, an MME accessed before attachment and a corresponding network entity are referred to as old MME/SGSN 152. And also, an MME accessed by the UE 100 to access a dedicated core network is referred to as a dedicated MME 154.

The PCRF 120 is an entity that controls QoS of traffic and charging.

Meanwhile, as mentioned above, the LTE system supports interworking with any access network other than 3GPP as well as E-UTRAN. If any non-3GPP access network is interworked, the non-3GPP access network may be connected to the PGW 160 directly or through an additional ePDG. For processing subscriber information or authentication with regard to the non-3GPP access network, a home subscriber server (HSS) 170 and an authentication, authorization and accounting (AAA) server may exchange information with each other and may also be realized as a signal entity. The term ePDG is exemplarily used for convenience. Even in case the non-3GPP access network is connected to the PGW directly or connected through any node, e.g., the S-GW, other than ePDG, an embodiment disclosed herein may be applied without any considerable modification.

Figure 2B:
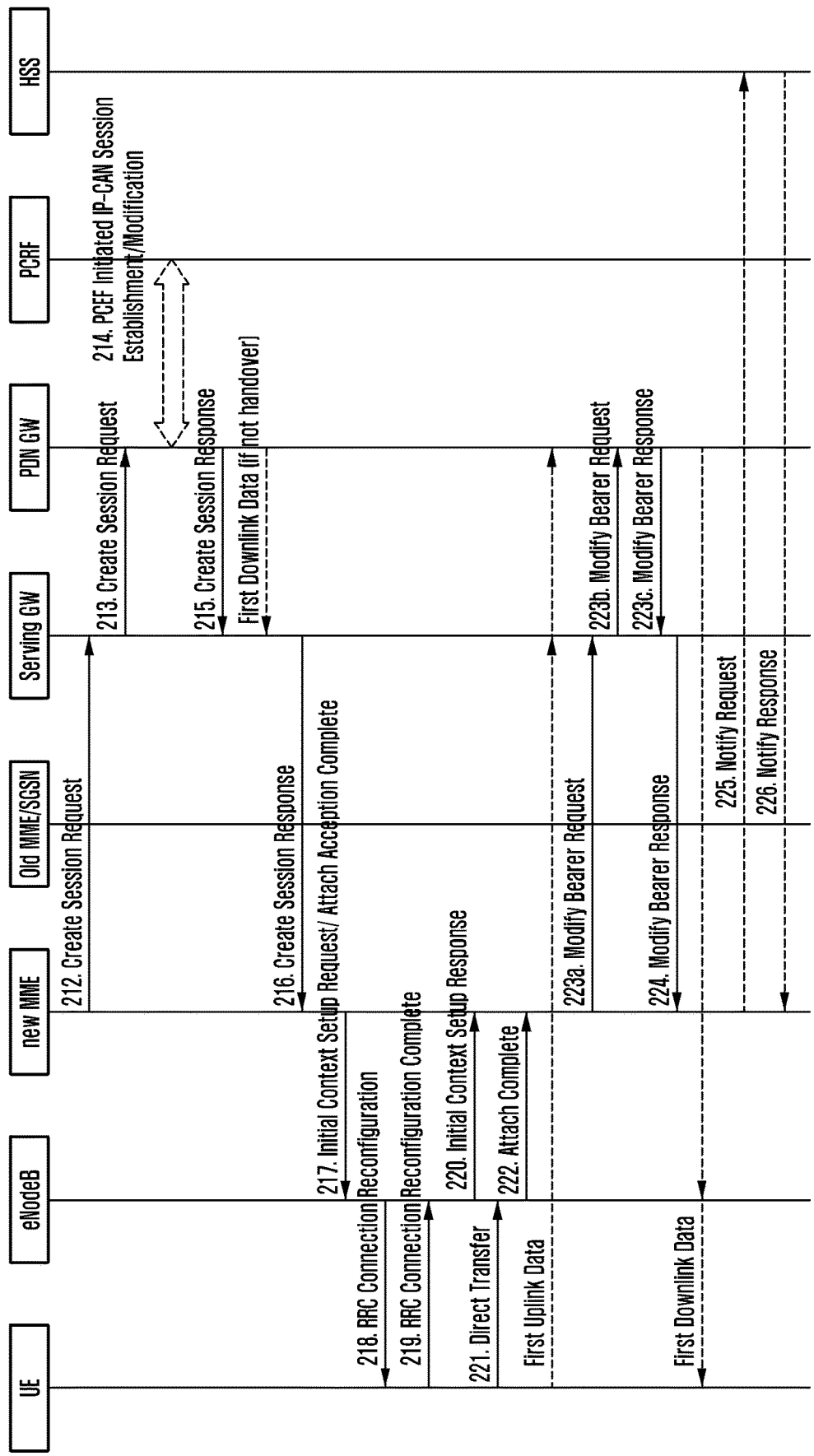

FIGS. 2A and 2B are flow diagrams illustrating a procedure in which UE registers with a network.

This registration procedure is also referred to as a network attachment. During this procedure, a default EPS bearer is created for always-on IP connectivity.

Referring to FIG. 2A, at step 201, the UE 100 may transmit an attach request message to the eNB 130. At step 202, the eNB 130 that receives the attach request message may transmit the attach request message to a new MME 150.

The new MME 150 that receives the attach request message may transmit an identification request message for identifying UE to an old MME or serving GPRS support node (SGSN) 152 at step 203a and may receive an identification response message from the old MME/SGSN 152 at step 203b. If the old MME/SGSN 152 and the new MME 150 fail to identify the UE 100, the new MME 150 may transmit an identity request message to the UE 100 at step 204a and may receive an identity response message containing an international mobile subscriber identity (IMSI) from the UE 100 at step 204b.

If context of the UE 100 does not exist in the network, the UE 100, the new MME 150 and the HSS 170 may perform an authentication/security procedure at step 205a.

After the authentication/security procedure, at step 205b, the UE 100 may transmit a ciphered identity request message to the new MME 150 and may receive a ciphered identity response message from the new MME 150. This step may be performed together with the authentication/security step 205a.

Thereafter, if the UE 100 sets a ciphered options transfer flag in the attach request message, the new MME 150 may transmit a ciphered options request message to the UE 100 at step 206a and may receive a ciphered options response message from the UE 100 at step 206b.

If there is activated bearer context for the UE 100 in the new MME 150, the new MME 150 may transmit a delete session request message to the S-GW 140 at step 207a. Then the S-GW 140, the P-GW 160 and the PCRF 120 may terminate a session at step 207b, and the S-GW 140 may transmit a delete session response message to the new MME 150 at step 207c.

If the MME is changed after the final detach, or if there is no valid subscriber context for the UE in the MME, the new MME 150 may transmit an update location request message to the HSS 170 at step 208. Then the HSS 170 may transmit a cancel location message to the old MMS/SGSN 152 at step 209a and may receive a cancel location ACK message from the old MMS/SGSN 152 at step 209b.

If there is activated bearer context for the UE 100 in the old MME/SGSN 152, the old MME/SGSN 152 may transmit a delete session request message to the S-GW 140 at step 210a. Then the S-GW 140, the P-GW 160 and the PCRF 120 may terminate a session at step 210b, and the S-GW 140 may transmit a delete session response message to the old MME 150 at step 210c. Thereafter, the HSS 170 may transmit an update location ACK message to the new MME 150 at step 211.

FIG. 2B shows steps after the new MME 150 receives the update location ACK message in FIG. 2A.

Referring to FIG. 2B, at step 212, the new MME 150 may transmit a create session request message to the S-GW 140. Then the S-GW 140 may create a session with the P-GW 160 and the PCRF 120 at steps 213, 214 and 215, and may transmit a create session response message to the new MME 150 at step 216.

Thereafter, the new MME 150 may transmit an initial context setup request message, by inserting an attach accept message therein, to the eNB 130 at step 217.

The eNB 130 that receives this may transmit a radio resource control (RRC) connection reconfiguration message to the UE 100 at step 218. If the UE 100 transmits an RRC connection reconfiguration complete message to the eNB 130 at step 219, the eNB 130 may transmit an initial context setup response message to the new MME 150 at step 220.

Thereafter, the UE 100 may transmit a direct transfer message containing an attach complete message to the eNB 130 at step 221, and the eNB 130 may deliver the attach complete message to the new MME 150 at step 222.

The new MME 150 that receives the initial context response message and the attach complete message may transmit a modify bearer request message to the S-GW 140 at step 223a. The S-GW 140 and the P-GW 160 may perform a bearer modification at steps 223b and 223c, and the S-GW 140 may transmit a modify bearer response message to the new MME 150 at step 224.

Thereafter, if a mobile equipment identity of the UE 100 is changed, the new MME 150 may transmit a notify request message to the HSS 170 at step 225 and may receive a notify response message from the HSS 170 at step 226.

Meanwhile, when the UE 100 transmits the attach request message to the eNB 130 at step 201, this attach request message may be contained in an RRC connection setup complete message that is transmitted from the UE to the eNB. Also, at step 202, the eNB may transmit an initial UE message, which is an S1-MME control message containing the attach request message, to the new MME 150.

At this time, a core network to which the new MME 150 receiving the attach request message from the UE 100 belongs may be not identical to a dedicated core network (DCN) of the UE. This dedicated core network may be used for allowing an operator to offer a particular function or for separating specific UE or subscriber. For example, the dedicated core network may be used for separating subscribers for machine-to-machine (M2M) communication or separating subscribers of a specific company.

The UE needs to access the DCN corresponding to a usage type thereof and then be offered a suitable service. However, if the eNB 130 fails to select the DCN, it may be required to deliver a message, transmitted to the MME/SGSN 150, to a dedicated MME/SGSN 154 contained in the DCN such that the UE can be serviced by the DCN. Therefore, described hereinafter is a method for allowing the UE to be offered a service from the DCN by rerouting an NAS message when the eNB fails to select the DCN.

FIG. 3A is a flow diagram illustrating an attach process of UE according to the first embodiment of the present invention. Steps which are not described herein may follow, partially or totally, a normal EPS attach procedure.

Referring to FIG. 3A, the new MME/SGSN 150 may receive an attach request message from the UE 100 through the eNB 130 at steps 201 and 202. Although the attach request message is used exemplarily herein, an NAS message including a tracking area update (TAU) message, a routing area update (RAU) message, or the like may be used alternatively. The attach request message may be delivered to the eNB 130 from the UE 100 in the form of being contained in an RRC message and also delivered to the MME/SGSN 150 from the eNB 130 in the form of being contained in an initial UE message (an RAN message).

The attach request message may contain a globally unique temporary UE identity (GUTI)/P-temporary mobile subscriber identity (P-TMSI) and/or additional GUTI/P-TMSI. In case a GUTI is created from a P-TMSI and a routing area identifier (RAI) (this GUTI may be referred to as a mapped GUTI), or in case a P-TMSI is created from a GUTI (this P-TMSI may be referred to as a mapped P-TMSI), the attach request message may contain additional GUTI/P-TMSI. If the DCN is not considered, the additional GUTI/P-TMSI may be used for checking whether there is context of UE identified using such additional GUTI/P-TMSI in the new MME/SGSI 150.

The new MME 150 that receives the attach request message may transmit an identification request message to the old MME/SGSN 152 at step 203 a and may receive an identification response message having MM context from the old MME/SGSN 152 at step 203b. The identification response message having MM context may contain UE usage type information. In embodiments disclosed herein, the UE usage type information may refer to information about UE. Specifically, the UE usage type information may be used for steering the UE to a suitable DCN. Namely, the UE usage type information may be information that indicates a usage character of the UE. A mobile communication network operator may deploy a suitable DCN for such a UE usage character.

The UE usage type information may be delivered in the form of being contained in the MM context or as an information element which is independent of the MM context. As will be described below in detail, a suitable DCN for serving the UE 100 may be identified from this UE usage type information, and the MME 150 may transmit suitable information to the eNB 130 so that the eNB 130 can retransmit the attach request message to a suitable DCN. Alternatively, contrary to this, the UE usage type information and/or any helpful information to select a DCN may be contained in an RRC message having the attach request message and then sent to the eNB 130.

At step 303a, the new MME/SGSN 150 that receives the identification response message may have already obtained the UE usage type information of the UE 100, and thus can determine whether to support a DCN depending on the UE usage type information of the UE 100.

As a result, if it is determined that the new MME/SGSN 150 fails to support a DCN of the UE, the new MME/SGSN 150 may reroute (also referred to as redirect) the attach request message such that the UE can receive a service from a suitable dedicated MME/SGSN 154.

As discussed above, the UE usage type information may be delivered through the identification response message transmitted from the old MME/SGSN 152 to the new MME 150 at step 203b or through an update location acknowledgement message transmitted from the HSS 170 to the new MME 150 at step 211. The update location acknowledgement message is a message delivered to the new MME 150 from the HSS 170 at step 211, and the HSS 170 may deliver subscription data to the new MME 150. At this time, the UE usage type information may be contained in the subscription data or delivered separately from the subscription data. Therefore, a redirection process of a non-access stratum (NAS) message to be described below may be performed after step 203b or after step 211. Also, the HSS 170 may deliver the UE usage type information to the MME 150 at step 205a.

Although an example of rerouting the attach request message is described above, this is not considered as a limitation of the present invention. Namely, this invention relates to a process of rerouting the NAS message, and this rerouting process may be performed during the attach procedure, the TAU procedure, and the RAU procedure.

Figure 3B:
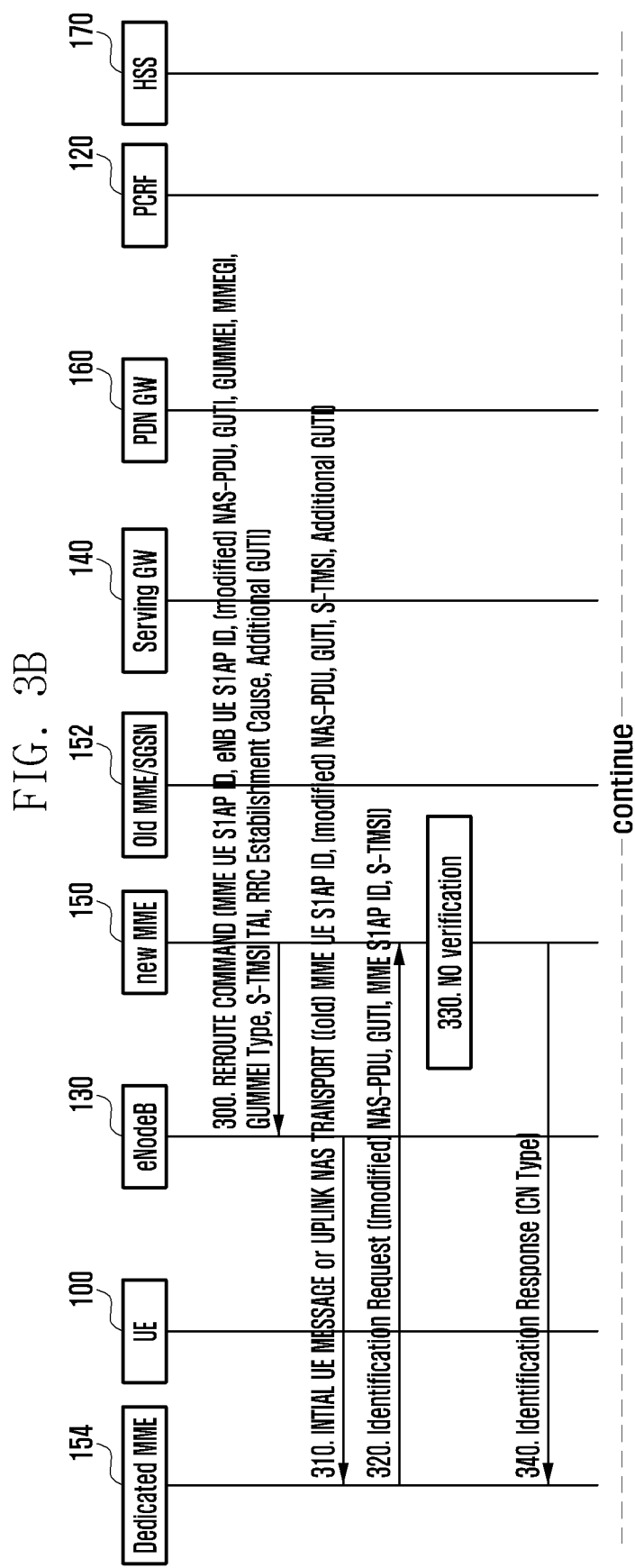
FIG. 3B is a flow diagram illustrating an NAS message reroute process according to the first embodiment of the present invention.

FIG. 3B is a flow diagram illustrating an NAS message reroute process according to the first embodiment of the present invention.

Referring to FIG. 3B, in case the new MME/SGSN 150 that becomes aware of the UE usage type applied to the UE 100 through step 203b, step 205a, and/or step 211 fails to support the DCN of the UE 100, the new MME/SGSN 150 may deliver, at step 300, a message for rerouting the NAS message to MME/SGSN corresponding to characteristics of UE. Herein, the MME/SGSN corresponding to characteristics of UE may refer to the dedicated MME/SGSN 154 located in the DCN corresponding to the UE usage type information of UE. In this case, a message (hereinafter, referred to as a redirection message) for rerouting the NAS message may be defined as a new RAN message named a reroute command message, reroute message, or a reroute NAS request message.

The redirection message (i.e., the RAN message) may contain at least one of MME UE S1AP ID, eNB UE S1AP ID, (revised) NAS-PDU (Protocol Data Unit), GUTI, GUMMEI (Globally Unique MME Identity), MMEGI (MME Group Identifier) or Null NRI (Network Resource Identifier)/SGSN group ID, GUMMEI type, S-TMSI (SAE Temporary Mobile Subscriber Identity), TAI (Tracking Area Identity) and RRC establishment cause, additional GUTI/P-TMSI, and information delivered to the MME/SGSN 150 by the eNB 130.

MME UE S1AP ID is an identifier allocated by the new MME/SGSN 150 to identify the UE 100 on the S1 interface. Also, eNB UE S1AP ID is an identifier allocated by the eNB 130 to identify the UE 100 on the S1 interface. Using eNB UE S1AP ID, the eNB 130 may determine which UE needs redirection. This eNB UE S1AP ID contained in the redirection message by the new MME/SGSN 150 may be identical to eNB UE S1AP ID contained in an S1 message received through at least one of steps 202, 204b, 205a, 205b and 206b.

NAS-PDU contained in the redirection message may be an NAS message received from the eNB. For example, the NAS message may be an attach request message. This attach request message may be identical to the attach request message received by the new MME/SGSN 150 at step 202 or a slightly revised version thereof. For example, the EPS mobile identity field of the attach request message may be revised to GUTI allocated by the new MME/SGSN 150. In another example, NAS-PDU may not be revised and GUTI may be delivered as an independent information element. In this case, the eNB 130 may deliver GUTI, received at step 300, as an independent information element to the dedicated MME/SGSN 154 when an initial UE message or uplink NAS transport message is transmitted at step 310.

GUMMEI, MMEGI or Null-NRI/SGSN group ID, GUMMEI type, S-TMSI, and additional GUTI/P-TMSI are information that may be used for the eNB 130 to select the dedicated MME/SGSN 154. The new MME/SGSN 150 may set at least one of GUMMEI, MMEGI or Null-NRI/SGSN group ID, GUMMEI type, and S-TMSI as a value associated with the dedicated MME/SGSN 154 and then transmit it to the eNB 130.

MMEGI or Null-NRI/SGSN group ID may be used to identify a DCN in a PLMN (Public Land Mobile Network).

GUMMEI may directly indicate the dedicated MME 154. GUMMEI may be formed of a PLMN identifier, MMEGI, and MMEC. The new MME may set a PLMN identifier as a serving PLMN of the UE 100 (namely, identical to a PLMN part of TAI), set MMEGI as a value corresponding to a dedicated MME group, and set MMEC (MME Code) as a value corresponding to MMEC of the new MME. The eNB 130 may select a dedicated MME group by using PLMN and MMEGI, and also select dedicated MME by referring to MMEC. In another example, GUMMEI may be a GUMMEI part of additional GUTI contained in the attach request message. MMEGI may be information corresponding to a dedicated MME group. This may be MMEGI included in MMEI (MME Identifier) contained in GUMMEI of additional GUTI contained in the attach request message.

TAI and RRC establishment cause may be information received from the eNB 130 together with the attach request message by the new MME 150.

Additional GUTI/P-TMSI may be contained in the reroute NAS message request only in case the attach request message received by the MME/SGSN 150 contains the additional GUTI/P-TMSI. Namely, if additional GUTI/P-TMSI is contained in the attach request message received at step 202, the MME/SGSN 150 may insert the additional GUTI/P-TMSI into the reroute NAS message request to be transmitted at step 300.

The eNB 130 that receives at least one kind of information mentioned above may insert the TAI and/or RRC establishment cause, received at step 300, into a message to be transmitted to the dedicated MME 154 at step 310. The new MME 150 may also transmit additional GUTI contained in the attach request message. This additional GUTI may be delivered only when the new MME 150 fails to find UE context by means of additional GUTI and when old GUTI denotes that GUTI is mapped with P-TMSI (P-temporary mobile subscriber identity) and RAI (routing area identifier).

The information delivered to the new MME/SGSN 150 by the eNB 130, which is contained in a message delivered by the eNB 130 at step 300, may mean information contained in the first initial UE message delivered by the eNB 130 at step 202. The information may include all or part of information delivered at step 202. According to 3GPP Release 13, the first initial UE message is formed as shown in Table 1.

TABLE 1

| IE/Group Name | Presence | IE type and reference | Semantics description | Criticality | Assigned Criticality |
|---|---|---|---|---|---|
| Message Type | M | | | YES | ignore |
| eNB UE S1AP ID | M | | | YES | reject |
| NAS-PDU | M | | | YES | reject |
| TAI | M | | Indicating the Tracking Area from which the UE has sent the NAS message. | YES | reject |
| E-UTRAN CGI | M | | Indicating the E-UTRAN CGI from which the UE has sent the NAS message. | YES | ignore |
| RRC Establishment Cause | M | | | YES | Ignore |
| S-TMSI | O | | | YES | reject |
| CSG Id | O | | | YES | reject |
| GUMMEI | O | | | YES | reject |
| Cell Access Mode | O | | | YES | reject |
| GW Transport Layer Address | O | Transport Layer Address | Indicating GW Transport Layer Address if the GW is collocated with eNB. | YES | ignore |
| Relay Node Indicator | O | | Indicating a relay node. | YES | reject |
| GUMMEI Type | O | ENUMERATED (native, mapped, . . .) | | YES | ignore |
| Tunnel Information for BBF | O | Tunnel Information | Indicating HeNB's Local IP Address assigned by the broadband access provider, UDP port Number. | YES | ignore |
| SIPTO L-GW Transport Layer Address | O | Transport Layer Address | Indicating SIPTO L-GW Transport Layer Address if the SIPTO L-GW is collocated with eNB. | YES | ignore |
| LHN ID | O | | | YES | ignore |
| MME Group ID | O | | | YES | ignore |

Among various kinds of information shown in Table 1, certain information may be known semipermanently to the eNB 130 and certain information may need to be received again since the eNB 130 has already received it from the UE 100 and then stores it. For example, GW Transport Layer Address is inherent information of the eNB 130 and thus known to the eNB 130. Also, RRC Establishment Cause is information received from the UE 100 at step 201.

However, since backhaul is not very congested in general, the redirection message delivered at step 300 may contain the first initial UE message completely for simplification of the operation of the MME/SGSN 150.

Additionally, the redirection message may contain other S1 message, e.g., an uplink NAS transport message. This is for encompassing various cases in which the UE delivers the NAS message. For example, the UE may register a new location in the MME/SGSN 150 after handover. In this case, since the NAS message for location registration is not the initial S1 message for the UE, the NAS message may be delivered through the uplink NAS transport message rather than through the initial UE message. In this case, the redirection message delivered at step 300 may contain the uplink NAS transport message.

For selecting the dedicated MME/SGSN 154, the eNB 130 may use at least one of MMEGI or Null-NRI/SGSN group ID and additional GUTI/P-TMSI which are received at step 300. Specifically, the eNB 130 may select MME/SGSN in a DCN indicated by MMEGI or Null-NRI/SGSN group ID. If additional GUTI/P-TMSI identifies MME/SGSN in the DCN indicated by MMEGI or Null-NRI/SGSN group ID, MME/SGSN identified by additional GUTI/P-TMSI may be selected.

The eNB 130 that selects the dedicated MME/SGSN 154 may transmit the second initial UE message or uplink NAS transport message to the dedicated MME/SGSN 154 at step 310. Herein, while an initial UE message transmitted to the new MME by the eNB at step 202 is referred to as the first initial UE message, an initial UE message transmitted to the dedicated MME by the eNB at step 310 is referred to as the second initial UE message. If it is not possible to find selectable MME/SGSN in a DCN identified by means of MMEGI or Null-NRI/SGSN group ID, the eNB 130 may select MME/SGSN in the default DCN or select again the MME/SGSN 150.

The above discussion may be applied to only a network which is not shared by several PLMNs. In a network shared by several PLMNs, a DCN may be selected using the following method.

The eNB 130 may select the dedicated MME/SGSN 154 by using a PLMN (CN operator) selected by the UE 100 and at least one of MMEGI or Null-NRI/SGSN group ID and additional GUTI/P-TMSI which are received at step 300. Specifically, the eNB 130 may select MME/SGSN in a DCN indicated by MMEGI or Null-NRI/SGSN group ID within the PLMN selected by the UE 100. If additional GUTI/P-TMSI identifies MME/SGSN in the DCN indicated by MMEGI or Null-NRI/SGSN group ID within the PLMN selected by the UE 100, the eNB 130 may select MME/SGSN identified by additional GUTI/P-TMSI. In this case, the PLMN in the additional GUTI/P-TMSI may be ignored.

Namely, in case the eNB 130 receives additional GUTI/P-TMSI in the network shared by several PLMNs, the eNB 130 may select (if possible) a core network indicated by a combination of the following information:

PLMN selected by the UE 100;

MMEGI or Null-NRI/SGSN group ID; and

Most significant 8 bits of MMEC or NRI in additional GUTI/P-TMSI.

In this case, a method for identifying the PLMN selected by the UE 100 at the eNB 130 may include at least one of the followings.

The eNB 130 may store and use information about the PLMN selected by the UE 100 by receiving it from the UE 100 at step 201. Also, the eNB 130 may identify the PLMN selected by the UE 100 from information contained in the redirection message (S1 message) received at step 300. In the latter case, the eNB 130 may extract a PLMN ID part of TAI information in the redirection message (S1 message) and thereby identify the PLMN selected by the UE.

The eNB 130 that selects the dedicated MME/SGSN 154 may transmit the second initial UE message or uplink NAS transport message to the dedicated MME/SGSN 154 at step 310. If it is not possible to find selectable MME/SGSN in a DCN identified by means of MMEGI or Null-NRI/SGSN group ID, the eNB 130 may select MME/SGSN in the default DCN or select again the MME/SGSN 150. Herein, the second initial UE message (S1 message) delivered at step 310 may be the S1 message contained in the redirection message received at step 300.

The second initial UE message of step 310 may include information contained in the first initial UE message transmitted at step 202 and further include at least one of MME UE S1AP ID, NAS-PDU, GUTI, S-TMSI, and additional GUTI. Namely, the second initial UE message delivered at step 310 may include the NAS message (e.g., the attach request message) delivered to the MME/SGSN 150 at step 202. The dedicated MME 154 that receives this may check, using at least one of additional GUTI and S-TMSI, whether there is context of the UE therein. If there is context of the UE, the existing UE context may be reused without obtaining context from any other node (the new MME 150 and/or the HSS 170). For example, context of the UE may be used for mobility management of the UE. At least one of NAS-PDU, GUTI, MME UE S1AP ID, and S-TMSI delivered at step 300 may be also delivered at step 320 through step 310.

Thereafter, at step 320, the new MME 150 may receive an MM context request message from the dedicated MME 154. At this time, the MM context request message may be an identification request message. The dedicated MME 154 may transmit the attach request message received from the new MME 150 through the eNB 130. Then, the new MME 150 may verify the attach request message and adjust an uplink NAS count in MME at step 303*a* in order to prevent errors at verification step. For example, even in case verification is made, the uplink NAS count may be not increased. The operation related to step 303*a* may be performed after step 205*a*.

When the MME that sends the identification request at step 320 is the dedicated MME 154, and/or when the reroute command message has been already sent for the UE identified by means of information contained in the identification request message, the new MME 150 may skip verification through NAS-PDU. In another example, when an indicator for indicating a verification skip is delivered at step 320, the new MME 150 may skip the verification step. As discussed above, verification is performed in case the NAS count is adjusted at step 303*a*. The new MME 150 may identify the UE 100 by using at least one of GUTI, MME UE S1AP ID, and S-TMSI contained in the identification request message for requesting MM context, and then deliver MM context corresponding to the UE by using an identification response message at step 340.

Thereafter, steps 204 to 211 shown in FIG. 2 may be performed. The difference is that the dedicated MME 154 is involved instead of the new MME 150.

Figure 3C:
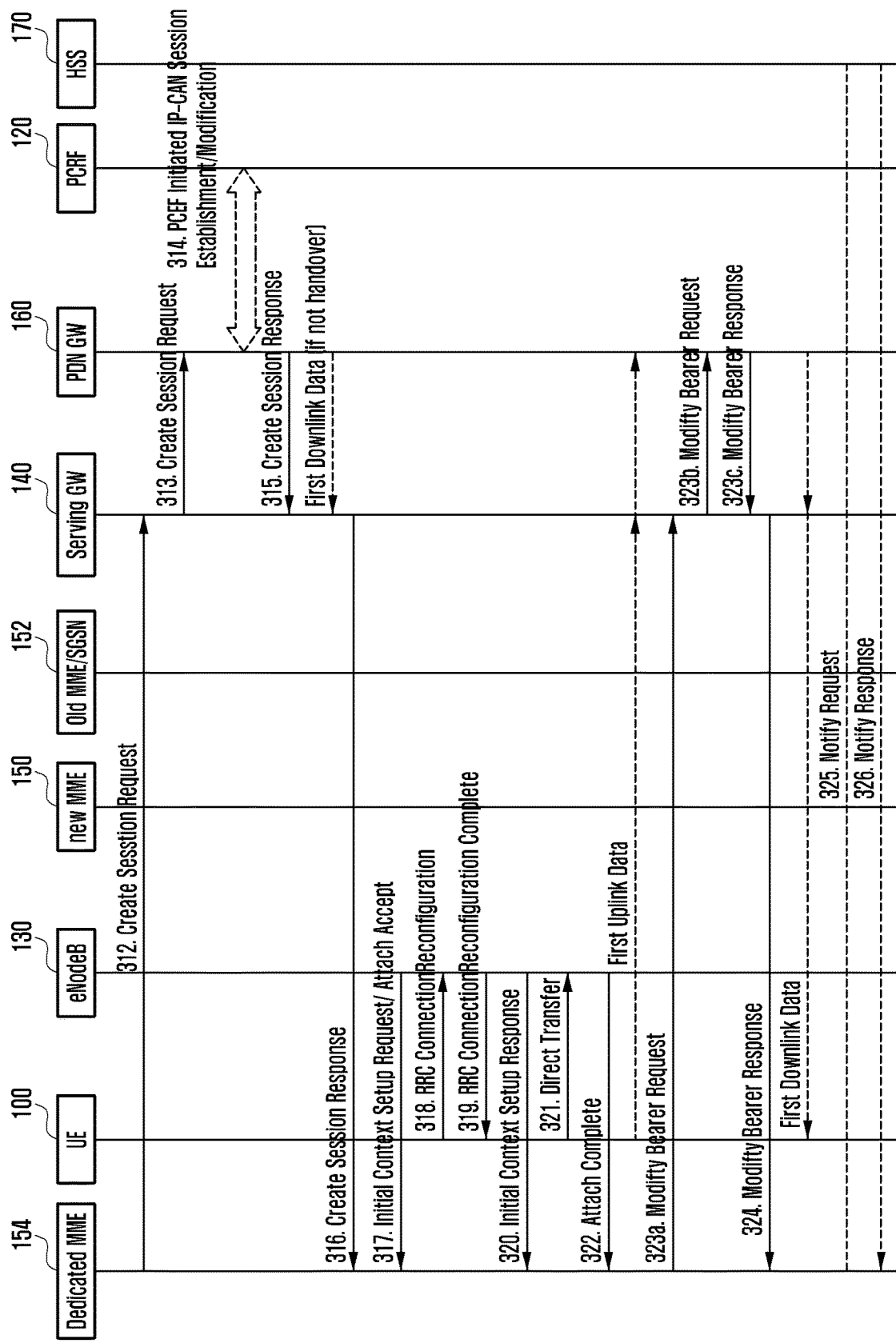
FIG. 3C is a flow diagram illustrating a process of registering UE in a network through MME/SGSN according to the first embodiment of the present invention.

FIG. 3C is a flow diagram illustrating a process of registering UE in a network through MME/SGSN according to the first embodiment of the present invention.

Referring to FIG. 3C, steps 312 to 326 shown in FIG. 3C may be identical to steps 212 to 226 previously discussed in FIG. 2B. However, contrary to FIG. 2B, the process of FIG. 3C involves the dedicated MME/SGSN 154 instead of the new MME 150 in the registration procedure. Details will be omitted herein since the same is discussed in FIG. 2B. Using the process discussed in FIGS. 3A to 3C, the UE can be offered a service through the DCN. In this case, the UE 100 may transit a message to a core network through two or more eNBs rather than through a single eNB only. For example, this message may be transmitted to the core network through HeNB, HeNB GW, MME or UE, relay node, donor eNB, and MME.

Figure 4:
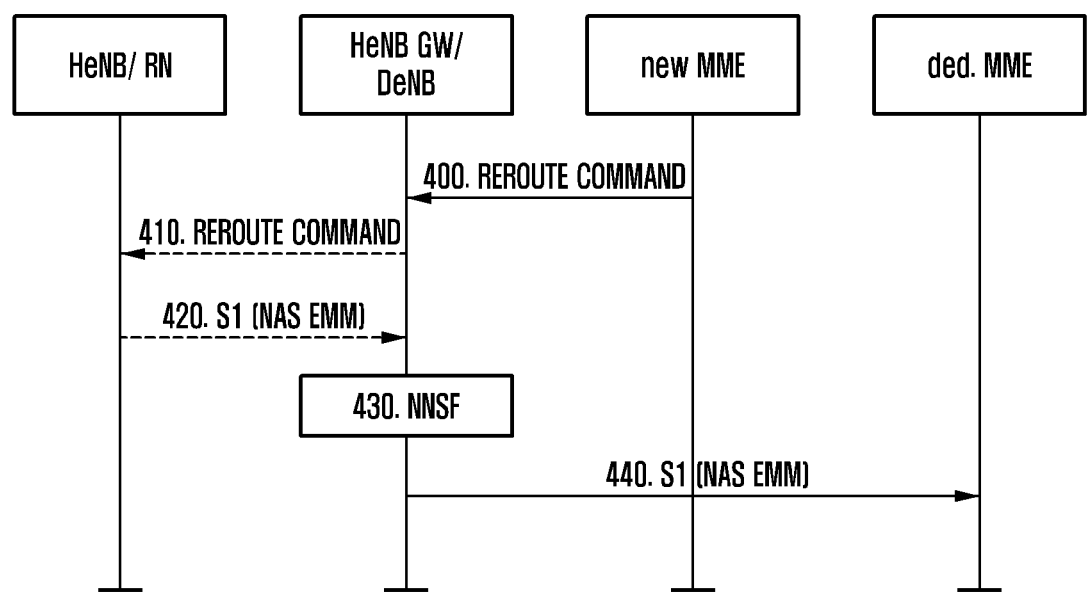
FIG. 4 is a flow diagram illustrating another NAS message reroute process according to the first embodiment of the present invention.

FIG. 4 is a flow diagram illustrating another NAS message reroute process according to the first embodiment of the present invention.

Referring to FIG. 4, the NAS message reroute process in case HeNB (home eNB)/DeNB (donor eNB) and HeNB GW (HeNB gateway)/RN (relay node) are included is shown.

The new MME may transmit the redirection message to the HeNB GW/DeNB at step 400. The redirection message may mean a message for rerouting the NAS message and may include a reroute command or a reroute NAS request message.

Considering that a UE-associated message is not terminated at the HeNB GW/DeNB except for unusual circumstance, steps 410 and 420 may be performed in spite of inefficiency in signaling. Also, in case an initial UE message needs revision, steps 410 and 420 may be performed.

Specifically, the HeNB GW/DeNB may transmit a reroute command to the HeNB/RN at step 410 and receive a response message (S1 (NAS EMM)) at step 420.

However, if the message delivered at step 400 contains the entire information of the attach request message delivered at step 202 (e.g., in case the first initial UE message delivered at step 202 is completely contained in the redirection message delivered at step 400), the HeNB GW and/or DeNB may perform a message redirection without performing steps 410 and 420 even though not storing information received from the HeNB and/or relay node. Therefore, in this case, the HeNB GW/DeNB may not transmit the reroute command message to the HeNB.

Additionally, step 400 may correspond to step 300 in FIG. 3. Specifically, information contained in the redirection message may be identical to information contained in the redirection message transmitted at step 300.

Thereafter, the HeNB GW may select a DCN at step 430. This step 430 may correspond to a process of selecting a core network node performed by the eNB 300 after step 300 in FIG. 3.

The HeNB GW that selects the DCN may transmit the S1 message to the dedicated MME at step 440. The step 440 (and step 420) may correspond to step 310 in FIG. 3, and detailed description thereof will be omitted.

Figure 5:
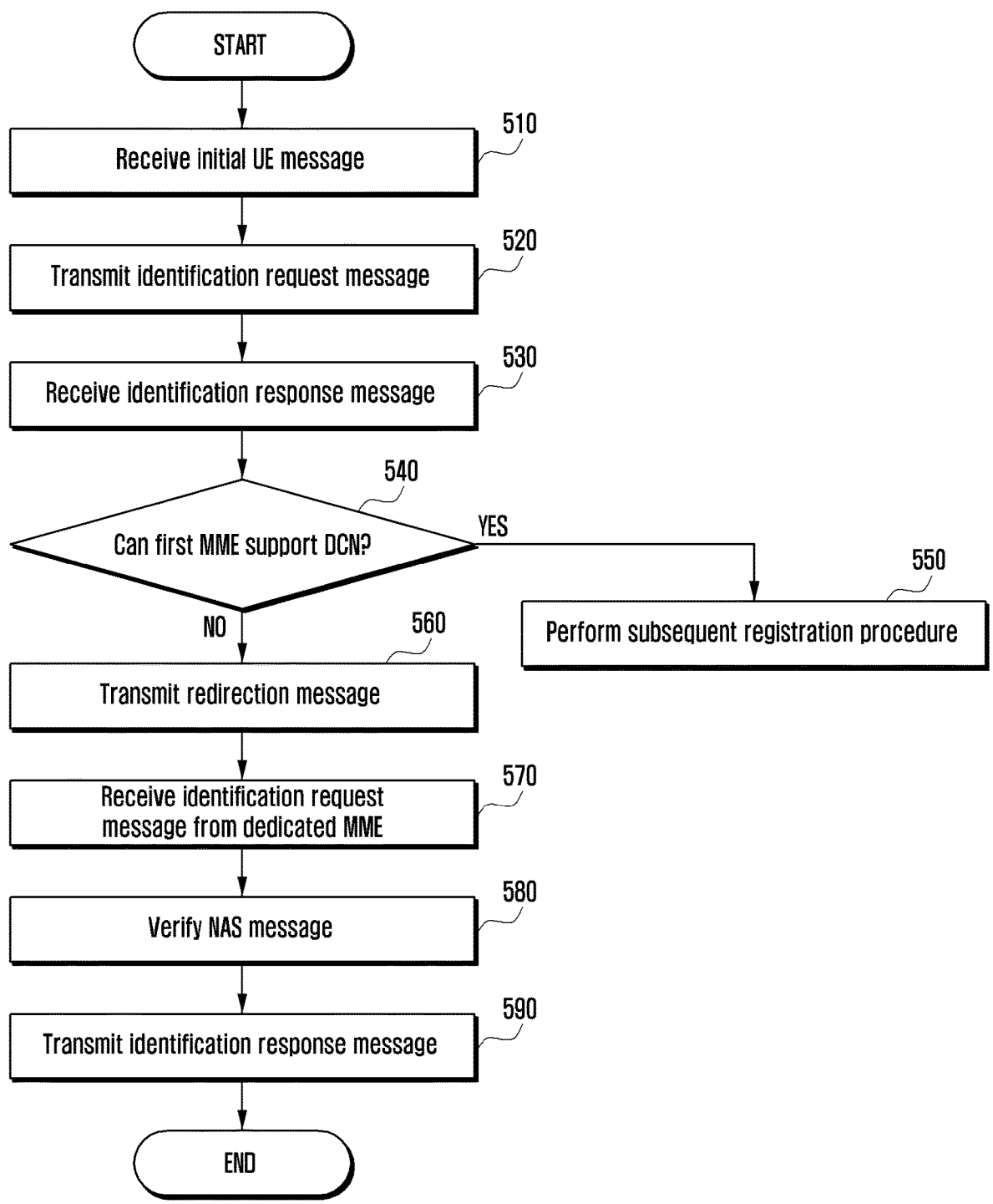
FIG. 5 is a flow diagram illustrating a process in which the first MME registers UE in a network according to the first embodiment of the present invention.

FIG. 5 is a flow diagram illustrating a process in which the first MME registers UE in a network according to the first embodiment of the present invention.

Referring to FIG. 5, the first MME may receive an initial UE message from the eNB at step 510. The initial UE message may contain an NAS message received from the UE by the eNB. The NAS message may be transmitted to the eNB from the UE in the form of being contained in an RRC message, and then transmitted to the first MME in the form of being contained in the initial UE message.

The first MME that receives the first message may transmit an identification request message to the second MME at step 520. Also, the first MME may receive an identification response message for the identification request message at step 530.

The identification response message may contain UE usage type information. The UE usage type information is information for indicating a usage type of UE and may be included in the MM context contained in the identification response message or may be transmitted as an information element which is independent of the MM context.

Additionally, the UE usage type information may be contained in an update location ACK message received from the HSS, and the following steps may be performed after the eNB receives the update location ACK message. This embodiment will be discussed regarding an example in which the UE usage type information is contained in the identification response message.

At step 540, the first MME that receives the identification response message may identify a DCN corresponding to the UE usage type information and then may check whether the first MME can support the DCN.

As the result of check, if it is determined that the first MME can support the DCN, the first MME may perform a subsequent network registration process of UE at step 550.

As the result of check, if it is determined that the first MME cannot support the DCN, the first MME may enable the UE to be serviced from a suitable dedicated MME through redirection of the attach request message.

Therefore, at step 560, the first MME may transmit a redirection message to the eNB so as to reroute the attach request message. At this time, the redirection message may include a reroute command message or a reroute NAS request message.

The redirection message may have at least one of MME UE S1AP ID, eNB UE S1AP ID, (revised) NAS-PDU (Protocol Data Unit), GUTI, GUMMEI (Globally Unique MME Identity), MMEGI (MME Group Identifier) or Null NRI (Network Resource Identifier)/SGSN group ID, GUMMEI type, S-TMSI (SAE Temporary Mobile Subscriber Identity), TAI (Tracking Area Identity) and RRC establishment cause, additional GUTI/P-TMSI, and information delivered to the MME/SGSN by the eNB.

NAS-PDU contained in the redirection message may include an NAS message. This embodiment uses an attach request message as the NAS message. Namely, the first MME may insert the received attach request message in the redirection message and then transmit it to the eNB. Also, the first MME may insert the attach request message with partially revised information in the redirection message and then transmit it to the eNB.

Additionally, the redirection message may contain totally the initial UE message received from the eNB.

Details of information contained in the redirection message are discussed earlier in FIG. 3B, so the repetition is omitted herein.

The first MME that transmits the redirection message may receive an identification request message from the dedicated MME at step 570. The identification request message may have the attach request message.

The first MME that receives the identification request message may check or verify the attach request message at step 580 and then adjust an NAS count in the first MME in order to prevent errors at the check or verification step. For example, even in case the attach request message is checked or verified, the uplink NAS count may be not increased.

Additionally, the first MME may identify the UE by using at least one of GUTI, MME UE S1AP ID, and S-TMSI which are contained in the identification request message. Then, at step 590, using an identification response message, the first MME may transmit MM context corresponding to the identified UE to the dedicated MME.

Figure 6:
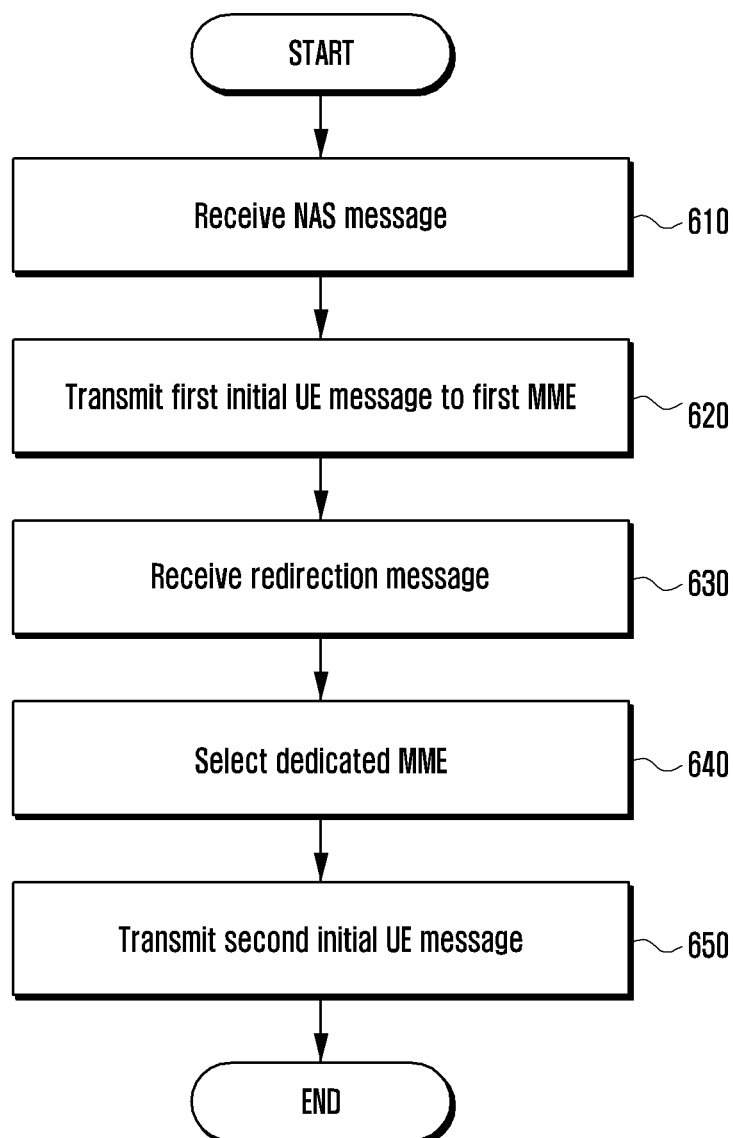
FIG. 6 is a flow diagram illustrating a process in which eNodeB registers UE in a network according to the first embodiment of the present invention.

FIG. 6 is a flow diagram illustrating a process in which eNodeB registers UE in a network according to the first embodiment of the present invention.

Referring to FIG. 6, the eNB may receive an NAS message contained in an RRC message at step 610. Since the NAS message may include an attach request message, a TAU message, an RAU message, etc., this process may be performed during an attach procedure, a TAU procedure, or an RAU procedure.

The eNB that receives the NAS message may transmit the first initial UE message having the NAS message to the first MME at step 620. In this case, since information contained in the first initial UE message is discussed earlier in FIG. 3B, the repetition is omitted herein.

If the first MME is not MME contained in the DCN, the first MME may transmit a redirection message for rerouting the NAS message to the eNB.

Therefore, at step 630, the eNB may receive the redirection message for rerouting the NAS message.

The redirection message may have at least one of MME UE S1AP ID, eNB UE S1AP ID, (revised) NAS-PDU (Protocol Data Unit), GUTI, GUMMEI (Globally Unique MME Identity), MMEGI (MME Group Identifier) or Null NRI (Network Resource Identifier)/SGSN group ID, GUMMEI type, S-TMSI (SAE Temporary Mobile Subscriber Identity), TAI (Tracking Area Identity) and RRC establishment cause, additional GUTI/P-TMSI, and information delivered to the MME/SGSN by the eNB.

The eNB that receives the redirection message may select the second MME by using information contained in the redirection message at step 640. In this case, the second MME may refer to a dedicated MME located in the DCN.

A method for selecting the second MME by using information contained in the redirection message is as follows.

The first MME may set, as a value associated with the dedicated MME/SGSN 154, at least one of GUMMEI, MMEGI or Null-NRI/SGSN Group ID, GUMMEI Type, and S-TMSI and transmit it to the eNB. Then the eNB may select the dedicated MME by using information set as the value associated with the dedicated MME. MMEGI or Null-NRI/SGSN Group ID may be used to identify a DCN in a PLMN. GUMMEI may directly indicate the dedicated MME. Specifically, GUMMEI may be formed of a PLMN identifier, MMEGI, and MMEC. In this case, a PLMN identifier may be set as a serving PLMN of the UE 100 (namely, identical to a PLMN part of TAI at step 102), MMEGI may be set as a value corresponding to a dedicated MME group, and MMEC (MME Code) may be set as a value corresponding to MMEC of the first MME. Therefore, the eNB may select a dedicated MME group by using a PLMN identifier and MMEGI, and then select a dedicated MME by referring to MMEC.

Additionally, the eNB may select MME/SGSN in the DCN indicated by MMEGI or Null-NRI/SGSN Group ID. If additional GUTI/P-TMSI identifies MME/SGSN in the DCN indicated by MMEGI or Null-NRI/SGSN Group ID, the eNB may select MME/SGSN identified by additional GUTI/P-TMSI.

Meanwhile, in a network shared by several PLMNs, a DCN may be selected using the following method.

The eNB may select a dedicated MME by using at least one of PLMN, MMEGI or Null-NRI/SGSN Group ID, and additional GUTI/P-TMSI which are selected by the UE. The eNB may select MME/SGSN in the DCN indicated by MMEGI or Null-NRI/SGSN Group ID in PLMN selected by the UE. If additional GUTI/P-TMSI identifies MME/SGSN in the DCN indicated by MMEGI or Null-NRI/SGSN Group ID, the eNB may select MME/SGSN identified by additional GUTI/P-TMSI. Namely, in case the eNB receives additional GUTI/P-TMSI, the eNB may select a core network by considering PLMN, MMEGI or Null-NRI/SGSN Group ID, and most significant 8 bits of MMEC or NRI in additional GUTI/P-TMSI which are selected by the UE. In this case, PLMN in additional GUTI/P-TSMI may be ignored.

A method in which the eNB identifies PLMN selected by the UE may be a method of storing PLMN selected by and received from the UE and then using stored information, or a method of using PLMN contained in the redirection message and selected by the UE.

In case of using information contained in the redirection message, the eNB may identify PLMN selected by the UE by extracting PLMN ID of TAI information contained in the redirection message.

Selection of DCN and dedicated MME by the eNB may be similar to that discussed in FIG. 3B.

The eNB that selects the dedicated MME may transmit the second initial UE message containing an NAS message to the dedicated MME at step 650. In this case, the second initial UE message may include the entire information contained in the redirection message. Also, the eNB may transmit an uplink NAS transport message to the dedicated MME. If it is not possible to find selectable MME in a DCN, the eNB may select MME in the default DCN or select again the MME.

Using the above-discussed process, the eNB may enable the UE to be offered service through a DCN.

Figure 7:
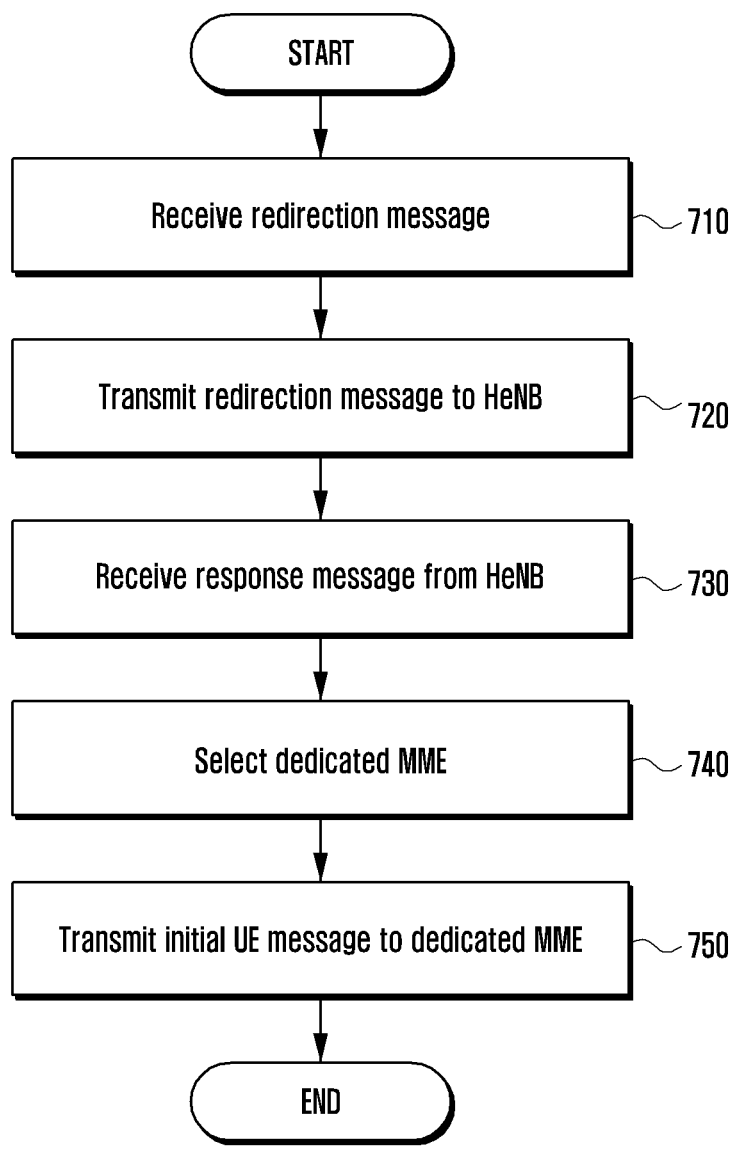
FIG. 7 is a flow diagram illustrating a process in which HeNB GW registers UE in a network according to the first embodiment of the present invention.

FIG. 7 is a flow diagram illustrating a process in which HeNB GW registers UE in a network according to the first embodiment of the present invention.

Referring to FIG. 7, the first MME that identifies a UE usage type may transmit a redirection message to HeNB GW in case of failing to support a DCN corresponding to the UE usage type. Details are similar to discussed above, so the repetition is omitted herein.

Therefore, the HeNB GW may receive the redirection message at step 710. The redirection message may include a reroute command or a reroute NAS request message.

In this case, the redirection message may include an NAS message received from the UE and delivered to the first MME.

Since a UE-associated message is not terminated at the HeNB GW/DeNB except for unusual circumstance, the HeNB GW may transmit the redirection message to the HeNB at step 720 in spite of inefficiency in signaling. Also, the HeNB GW may receive a response message (an initial UE message) at step 730. Also, in case the initial UE message needs revision, the HeNB GW may transmit the redirection message to the HeNB and then receive the response message.

However, if the redirection message has the entire information contained in the attach request message, the HeNB GW may perform step 740 without performing steps 720 and 730.

At step 740, the HeNB GW may select the DCN and dedicated MME. The HeNB GW may select the dedicated MME by using information contained in the redirection message. Details are similar to those discussed above, so the repetition is omitted herein.

The HeNB GW that selects the dedicated MME may transmit the initial UE message having the redirection message to the dedicated MME at step 750. Using the above-discussed process, the HeNB GW may enable the UE to be offered service through a DCN.

Figure 8:
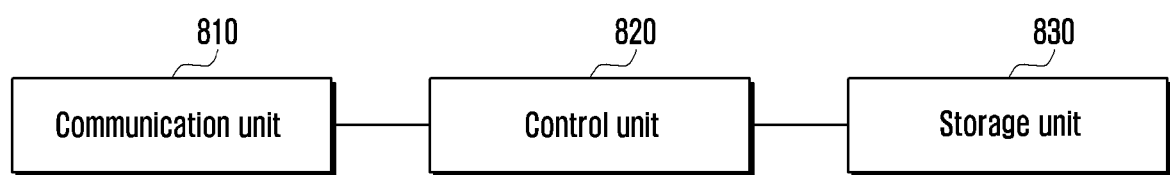
FIG. 8 is a block diagram illustrating a configuration of the first MME according to the first embodiment of the present invention.

FIG. 8 is a block diagram illustrating a configuration of the first MME according to the first embodiment of the present invention.

Referring to FIG. 8, the first MME may be formed of a communication unit 810, a control unit 820, and a storage unit 830.

The communication unit 810 may perform communication with other network entities such as the eNB, the second MME, or the like.

The control unit 820 may control the reception of an initial UE message from the eNB. The initial UE message may contain an NAS message transmitted from the UE.

Additionally, the control unit 820 may control the transmission and reception of an identification request message and an identification response message to and from the second MME, and may check UE usage type information contained in the received identification response message. Also, the control unit 820 may control the reception of an update location ACK message from the HSS, and may check UE usage type information contained in the update location ACK message. The control unit 820 may determine whether to support a DCN according to the UE usage type information.

In case of failing to support the DCN as the result of determination, the control unit 820 may create a redirection message for rerouting the NAS message so as to allow the UE to be serviced from a dedicated MME, and then may transmit the redirection message to the eNB. The redirection message may include all or part of information contained in the NAS message. Additionally or alternatively, the redirection message may include all or part of information contained in the initial UE message.

Namely, the control unit 820 may deliver the received NAS message, as it is, to the eNB so that the eNB can forward the NAS message to the dedicated MME. Therefore, the UE can be offered a service from the DCN.

Additionally, the control unit 820 may insert, in the redirection message, at least one of MME UE S1AP ID, eNB UE S1AP ID, (revised) NAS-PDU (Protocol Data Unit), GUTI, GUMMEI (Globally Unique MME Identity), MMEGI (MME Group Identifier) or Null NRI (Network Resource Identifier)/SGSN group ID, GUMMEI type, S-TMSI (SAE Temporary Mobile Subscriber Identity), TAI (Tracking Area Identity) and RRC establishment cause, additional GUTI/P-TMSI, and information delivered to the MME/SGSN by the eNB. Therefore, using such information, the eNB may determine the dedicated MME.

Further, the control unit 820 may control the reception of an identification request message from the dedicated MME. After this reception, the control unit 820 may check or verify the NAS message contained in the identification request message.

Further, the control unit 820 may identify the UE by using at least one of GUTI, MME UE S1AP ID, and S-TMSI which are contained in the received identification request message. Therefore, using an identification response message, the control unit 820 may transmit MM context corresponding to the identified UE to the dedicated MME.

The storage unit 830 may store information contained in the initial UE message received from the eNB. Also, the storage unit 830 may store information contained in the identification response message received from the second MME and information contained in the update location ACK message received from the HSS. Therefore, information stored in the storage unit 830 may be used when the control unit 820 checks whether the DCN corresponding to the UE usage type information can be supported. Also, such information may be used when the control unit 820 creates the direction message.

Figure 9:
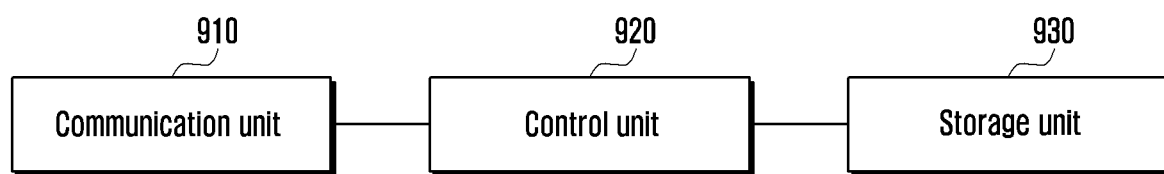
FIG. 9 is a block diagram illustrating a configuration of eNodeB according to the first embodiment of the present invention.

FIG. 9 is a block diagram illustrating a configuration of eNodeB according to the first embodiment of the present invention.

Referring to FIG. 9, the eNB may be formed of a communication unit 910, a control unit 920, and a storage unit 930.

The communication unit 910 may perform communication with other network entities such as the first MME, the UE, the dedicated MME, or the like.

The control unit 920 may control the reception of an NAS message contained in an RRC message from the UE. The control unit 920 may create the first initial UE message including the received NAS message and then transmit it to the first MME. Information contained in the first initial UE message is discussed earlier in FIG. 3B, so the repetition is omitted herein.

In case the first MME that receives the first initial UE message from the eNB is not a dedicated MME, the control unit 920 may receive a direction message from the first MME. The redirection message may include all or part of information contained in the NAS message. Additionally or alternatively, the redirection message may include all or part of information contained in the first initial UE message.

When the redirection message having the NAS message or the first initial UE message is received, the control unit 920 may forward the received message to the dedicated MME. Alternatively, the control unit 920 may create the second initial UE message having the NAS message contained in the redirection message and then transmit it to the dedicated MME.

Therefore, the control unit 920 should determine the dedicated MME. A method for determining the dedicated MME is as follows.

The redirection message may contain at least one of MME UE SlAP ID, eNB UE S1AP ID, (revised) NAS-PDU (Protocol Data Unit), GUTI, GUMMEI (Globally Unique MME Identity), MMEGI (MME Group Identifier) or Null NRI (Network Resource Identifier)/SGSN group ID, GUMMEI type, S-TMSI (SAE Temporary Mobile Subscriber Identity), TAI (Tracking Area Identity) and RRC establishment cause, additional GUTI/P-TMSI, and information delivered to the MME/SGSN by the eNB.

The first MME may set, as a value associated with the dedicated MME/SGSN 154, at least one of GUMMEI, MMEGI or Null-NRI/SGSN Group ID, GUMMEI Type, and S-TMSI and transmit it to the eNB. Then the control unit 920 may select the dedicated MME by using information which is set as the value associated with the dedicated MME.

MMEGI or Null-NRI/SGSN Group ID may be used to identify a DCN in a PLMN.

GUMMEI may directly indicate the dedicated MME. Specifically, GUMMEI may be formed of a PLMN identifier, MMEGI, and MMEC. In this case, a PLMN identifier may be set as a serving PLMN of the UE 100 (namely, identical to a PLMN part of TAI at step 102), MMEGI may be set as a value corresponding to a dedicated MME group, and MMEC (MME Code) may be set as a value corresponding to MMEC of the first MME. Therefore, the control unit 920 may select a dedicated MME group by using a PLMN identifier and MMEGI, and then select a dedicated MME by referring to MMEC.

Additionally, the control unit 920 may select MME/SGSN in the DCN indicated by MMEGI or Null-NRI/SGSN Group ID. If additional GUTI/P-TMSI identifies MME/SGSN in the DCN indicated by MMEGI or Null-NRI/SGSN Group ID, MME/SGSN identified by additional GUTI/P-TMSI may be selected.

Meanwhile, in a network shared by several PLMNs, the control unit 920 may select a DCN by using the following method.

The control unit 920 may select a dedicated MME by using at least one of PLMN, MMEGI or Null-NRI/SGSN Group ID, and additional GUTI/P-TMSI which are selected by the UE. The control unit 920 may select MME/SGSN in the DCN indicated by MMEGI or Null-NRI/SGSN Group ID in PLMN selected by the UE. If additional GUTI/P-TMSI identifies MME/SGSN in the DCN indicated by MMEGI or Null-NRI/SGSN Group ID, MME/SGSN identified by additional GUTI/P-TMSI may be selected. Namely, in case additional GUTI/P-TMSI is received, the control unit 920 may select a core network by considering PLMN, MMEGI or Null-NRI/SGSN Group ID, and most significant 8 bits of MMEC or NRI in additional GUTI/P-TMSI which are selected by the UE. In this case, PLMN in additional GUTI/P-TSMI may be ignored.

In this case, the control unit 920 may control the storage unit 930 to store PLMN selected by and received from the UE, and may use stored information. Alternatively or additionally, the control unit 920 may identify PLMN selected by the UE through PLMN contained in the redirection message.

If it is not possible to find selectable MME in a DCN, the eNB may select MME in the default DCN or select again the MME.

Using the above-discussed process, the control unit 920 may enable the UE to be offered service through a DCN.

The storage unit 930 may store information contained in the RRC message received from the eNB. Also, the storage unit 930 may store information contained in the identification response message received from the first MME. Such information stored in the storage unit 930 may be used for creating the first initial UE message or the second initial UE message.

Figure 10:
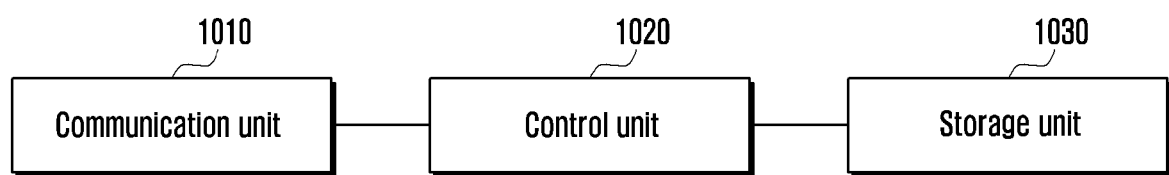
FIG. 10 is a block diagram illustrating a configuration of UE according to the first embodiment of the present invention.

FIG. 10 is a block diagram illustrating a configuration of UE according to the first embodiment of the present invention.

Referring to FIG. 10, the UE may be formed of a communication unit 1010, a control unit 1020, and a storage unit 1030.

The communication unit 1010 may perform communication with other network entities such as the eNB, the first MME, or the like.

The control unit 1020 may create an RRC message having an NAS message and transmit the created RRC message to the eNB through the RRC layer. The NAS message may include at least one of an attach request message, a TAU message, and an RAU message.

The NAS message may be contained in the first initial UE message transmitted to the first MME by the eNB. Also, the NAS message may be contained in the redirection message transmitted by the first MME. The eNB that receives the redirection message having the NAS message may create the second initial UE message having the NAS message and then transmit it to the dedicated MME.

The storage unit 1030 may store the created NAS message. Also, the storage unit 1030 may store ID information for response to an ID request. Also, the storage unit 1030 may store authentication information.

Second Embodiment

Hereinafter, a congestion control method and apparatus for an application according to the second embodiment of the present invention will be described.

According as the number of transmission packets is increased in a network, the performance of the network is degraded. A phenomenon of rapid degradation in network performance is referred to as congestion.

Typically, when congestion occurs, ACM, SSAC, EAB, SCM, etc. are used as access control technique for UE. However, the UE fails to support an application-specific congestion control for data communication (ACDC).

If there is pending uplink data in the UE when the UE sends a tracking area update (TAU) request message, the UE sets an active flag of the TAU request message to 1 and performs transmission. As a result, a user plane connection is established between the UE and the network.

Therefore, ACDC may be applied even when an active flag of the TAU request message is 1. The present invention proposes a method for applying ACDC in case of TAU.

Additionally, in case the UE uses a power saving mode (PSM), the UE inserts an active timer in the TAU request message and transmits it to the network. In this case as well, since the active flag may be set to 1 when there is pending uplink data, ACDC should be applied. Also, the UE that has the active timer and intends to enter PSM may be allowed to send a service request regardless of ACDC with regard to the service request sent during the period of time.

In this disclosure, ACDC may be determined according to operator's policy or regional regulations, providing a service in a disaster state and also controlling congestion for a commercial service. Additionally, ACDC may be used as a similar concept with other functions capable of a congestion control for each application. An embodiment of the present invention may be similarly used generally in wireless communication such as WLAN, Bluetooth, Zigbee, and the like in addition to the communication system discussed herein. Additionally, a mobile communication operator may provide UE with information for ACDC. This may be implemented using OMA standard called Management Object (MO) and thus referred to as ACDC MO. In order to deliver ACDC MO, a network operator may use other method such as presetting in the UE or SIM rather than using OMA standard.

Figure 11:
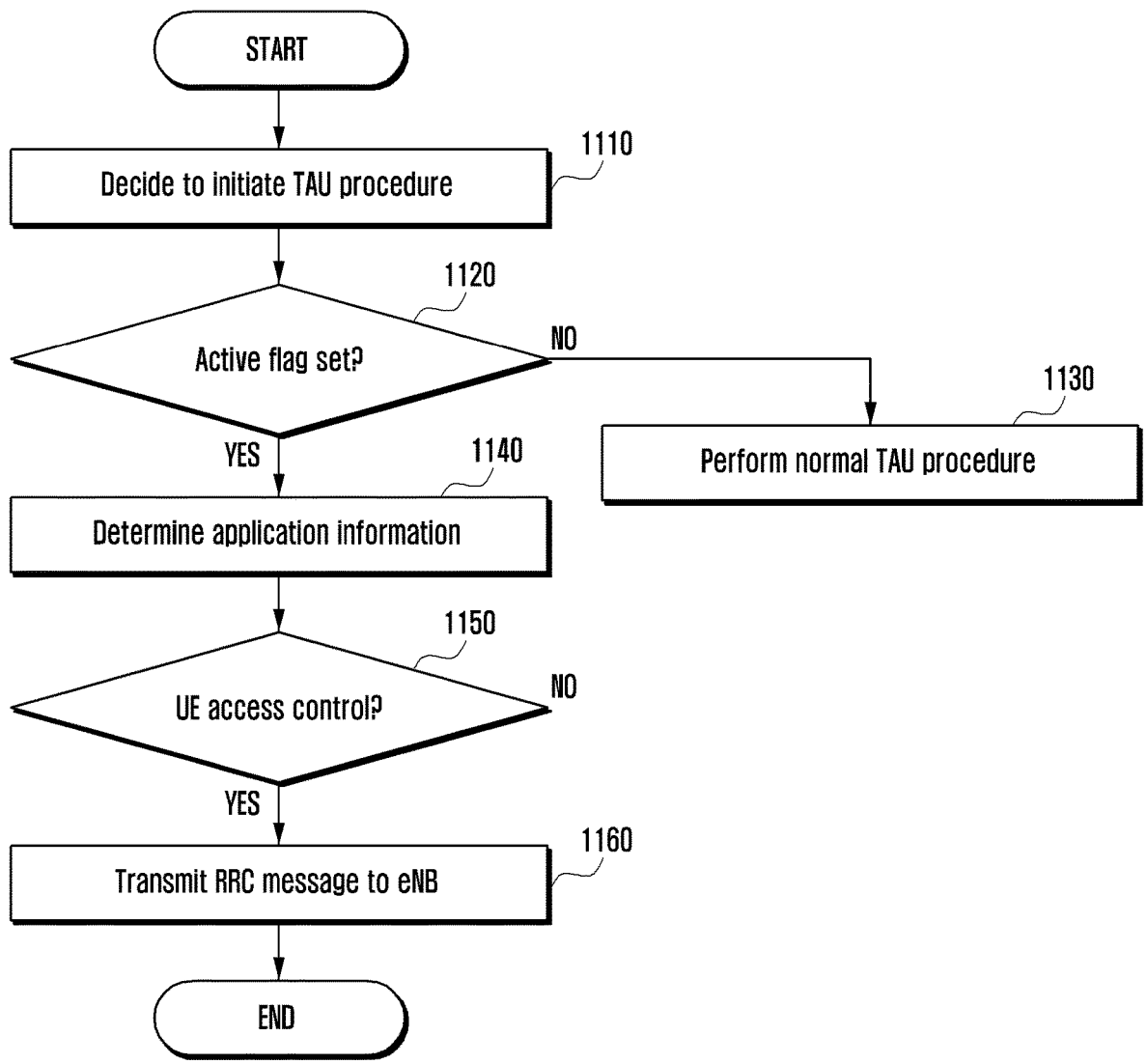
FIG. 11 is a flow diagram illustrating a process in which UE applies ACDC in a TAU procedure according to the second embodiment of the present invention.

FIG. 11 is a flow diagram illustrating a process in which UE applies ACDC in a TAU procedure according to the second embodiment of the present invention.

Referring to FIG. 11, the UE may decide to initiate the TAU procedure at step 1110 according as a tracking area is changed. When initiating TAU, the UE may have uplink data to be transmitted through a network.

At step 1120, the UE may determine whether to set the active flag of the TAU message to 1 by determining whether there is uplink data in the UE. If there is no uplink data in the UE, the UE may not set the active flag to 1 and perform a normal TAU procedure at step 1130. Namely, the UE may transmit a TAU message contained in an RRC message to the eNB without checking application information.

If there is uplink data in the UE, the UE may set the active flag of the TAU message to 1. Then, at step 1140, the UE may determine information about an application that generates the uplink data.

In this case, the application information may be a criterion of determination for applying ACDC, depending on an application from which pending uplink data in the UE is generated. The application information may include an application category.

For example, if an application that generates uplink data belongs to an application category having lower priority, access may be disallowed (hereinafter, the term barring may be also used) as the result of applying ACDC and thus data may be not transmitted.

If an application that generate uplink data belongs to an application category having higher priority, a UE access process may be performed again even in case of barring access by an application contained in an application category having lower priority.

Therefore, the UE may identify an application generating transmission-ready uplink data and check an application category by using an identifier of the application and setting information thereof. Herein, this setting information may be contained in ACDC MO. Namely, the UE may map the application to an application category received with ACDC MO. Through this procedure, the UE finds application information.

In this case, an application category contained in application information may be formed of bit information. For example, in case information is formed of 3 bits, category #1 may be represented as 001 and category #4 may be represented as 011. A value from 2 bits to 8 bits may be used.

The UE that finds application information may determine, at step 1150, whether to control access. Namely, the UE may determine whether to perform access barring.

Specifically, the UE may extracts, from system information block (SIB) information received from the eNB, a barring factor corresponding to an application category contained in application information. The UE may determine, based on a value specified or created through random number generation using the barring factor, whether to perform access barring or not (i.e., pass).

At this time, access barring of UE may mean, for example, that the TAU procedure of UE is not initiated. Namely, it may mean that the UE does not transmit the TAU message to the eNB.

However, as discussed above, even in case of access barring due to lower priority of a specific application category, the access procedure may be performed if the UE supports ACDC in case radio resources of a user plane is requested for an application category having higher priority.

If the access of UE is passed, the UE may transmit the RRC message containing the TAU message to the eNB at step 1260.

Figure 12:
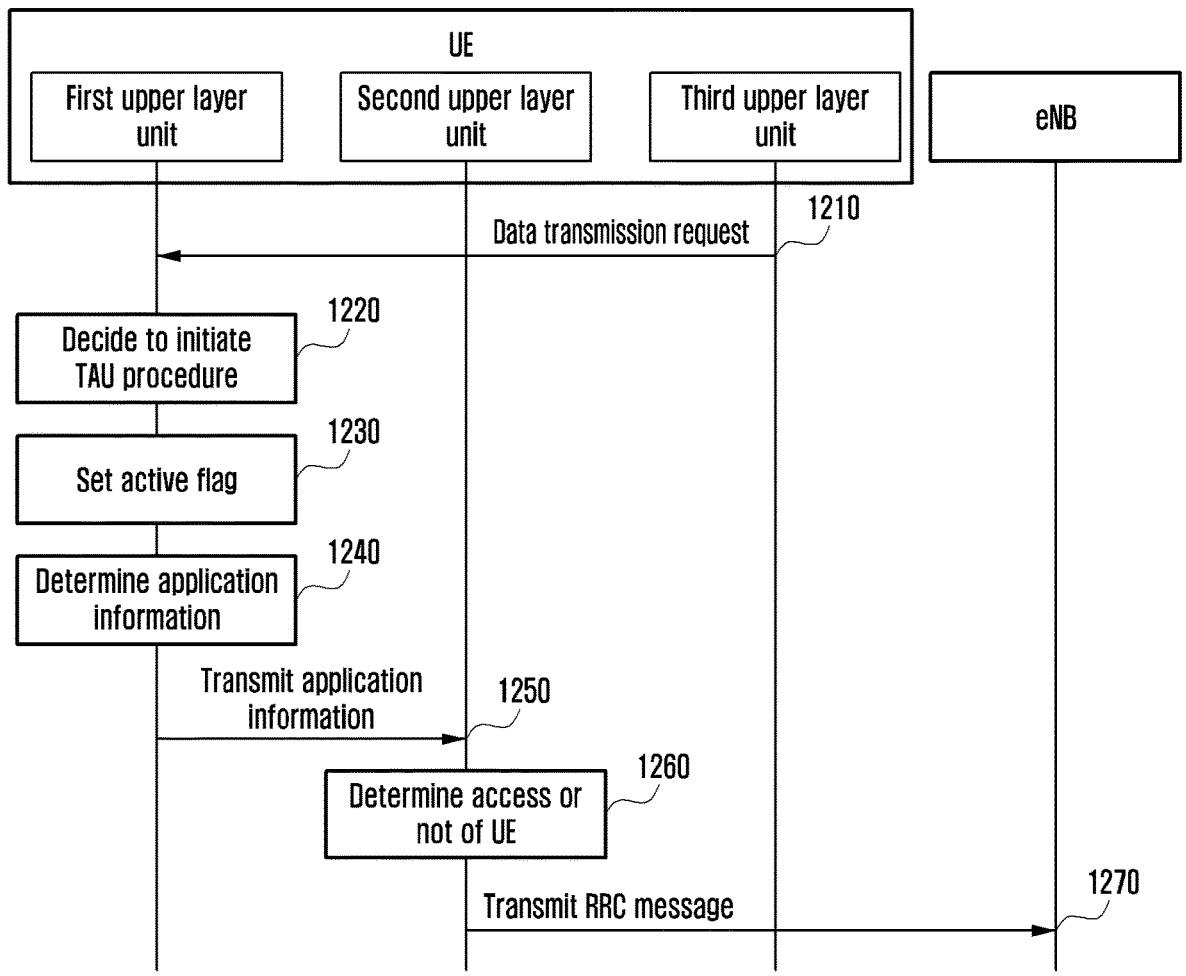
FIG. 12 is a flow diagram illustrating a process of applying ACDC in a TAU procedure according to the second embodiment of the present invention.

FIG. 12 is a flow diagram illustrating a process of applying ACDC in a TAU procedure according to the second embodiment of the present invention.

Referring to FIG. 12, the first upper layer unit of the UE may receive a data transmission request from the third upper layer unit at step 1210. Then the first upper layer unit may decide to initiate a TAU procedure at step 1220. Although an example in which the first upper layer unit initiates the TAU procedure after receiving the data transmission request is shown, the first upper layer unit may decide to initiate the TAU procedure and then receive the data transmission request from the third upper layer unit.

Herein, the first upper layer unit may mean an apparatus for controlling operations on an NAS layer. Also, the third upper layer unit may mean an apparatus for controlling operations on an application layer.

Meanwhile, when the UE initiates the TAU procedure, the UE may have uplink data to be transmitted through a network.

If the UE supports ACDC, if user plane radio resource allocation according to uplink data is requested, and if it is possible to apply ACDC to this request, the UE may set the active flag of the TAU message to 1 at step 1230. Additionally, at step 1240, the UE may determine information about an application that generates the uplink data. This application information may contain an application category, which is discussed for example hereinafter. However, the application information is not limited to application category information.

In this case, an application from which uplink data pending in the UE is generated may be a criterion for applying ACDC. For example, if an application that generates uplink data belongs to an application category having lower priority, access barring is determined as the result of applying ACDC and thus data may be not transmitted.

Therefore, the UE may find an application category by identifying an application generating transmission-ready uplink data and by using an identifier of the application and setting information thereof. Herein, this setting information may include category determination information for finding the category of an application, and may be contained in ACDC MO. Namely, the UE may map the application to an application category received with ACDC MO. This ACDC MO may be received through the application that generates transmission-ready uplink data. Through this procedure, the UE finds application information.

The UE that finds application information may transmit the application information to the second upper layer unit of the UE at step 1250. Herein, the second upper layer unit may mean an apparatus for controlling operations on a radio resource control (RRC) layer of the UE.

At this time, the first upper layer unit of the UE may form a call type, based on application category information for applying ACDC, the TAU message, and RRC establishment cause, and then may deliver this information to the second upper layer unit.

In this case, application category information for applying ACDC may be formed of bit information for indicating an application category. For example, in case information is formed of 3 bits, category #1 may be represented as 001 and category #4 may be represented as 011. A value from 2 bits to 8 bits may be used.

At step 1260, the second upper layer unit that receives the TAU message, the application category information for applying ACDC, and the RRC establishment cause from the first upper layer unit may determine UE access or not. In order to determine transmission of uplink data, the UE may compare the application category information for applying ACDC with ACDC information of SIB information received from the eNB.

Specifically, the UE may extracts, from SIB information, a barring factor corresponding to the application category information received from the first upper layer unit. Then, based on the barring factor, the UE performs an access control, i.e., UE access barring or passing, depending on a value specified or created through random number generation.

At this time, barring UE access may mean, for example, that the TAU procedure of UE is not initiated. Namely, it may mean that the UE does not transmit the TAU message to the eNB.

However, even in case of access barring due to lower priority of a specific application category, the access procedure may be performed if the UE supports ACDC when radio resources of a user plane is requested for an application category having higher priority.

If the access of UE is passed, the UE may transmit the RRC message to the eNB at step 1270. This RRC message contains the TAU message received from the first upper layer unit of the UE.

Meanwhile, if the UE does not set the active flag to 1 at step 1230, the UE does not perform application category mapping for ACDC. Instead, the UE sets a call type complying with TAU initiation conditions, based on the TAU message and the establishment cause, and then deliver this information to the second upper layer unit. Thereafter, the second upper layer unit transmits the TAU message contained in the RRC message to the eNB.

Figure 13:
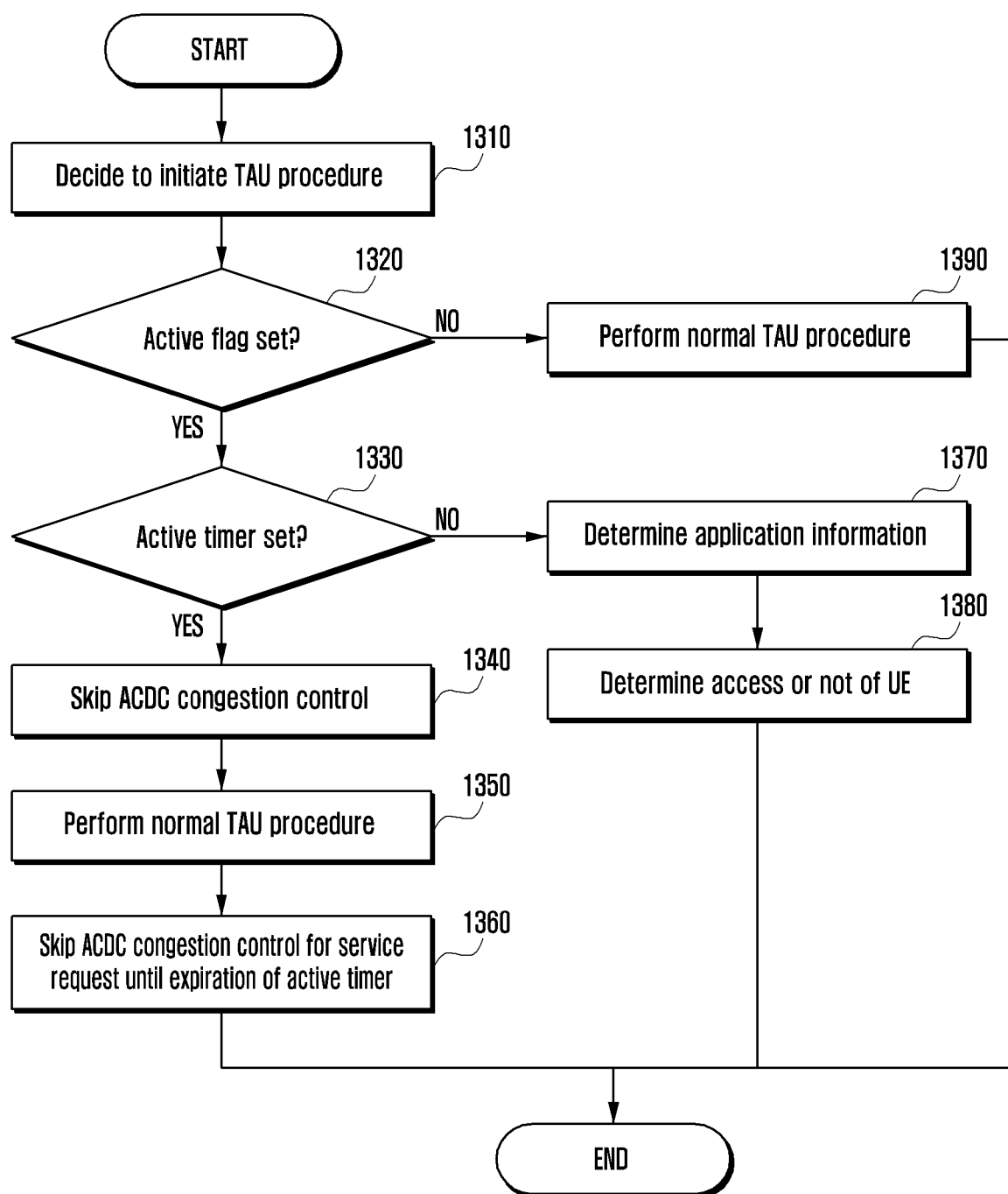
FIG. 13 is a flow diagram illustrating another process in which UE applies ACDC in a TAU procedure according to the second embodiment of the present invention.

FIG. 13 is a flow diagram illustrating another process in which UE applies ACDC in a TAU procedure according to the second embodiment of the present invention.

Referring to FIG. 13, the UE may decide to initiate the TAU procedure at step 1310 according as a tracking area is changed. When initiating the TAU procedure, the UE may have uplink data to be transmitted through a network.

If there is uplink data in the UE, the UE may set the active flag of the TAU message to 1 at step 1320.

In this case, an application from which uplink data pending in the UE is generated may be a criterion for applying ACDC. For example, if an application that generates uplink data belongs to an application category having lower priority, access barring is determined as the result of applying ACDC and thus data may be not transmitted.

If an application that generate uplink data belongs to an application category having higher priority, a UE access process may be performed again even in case of barring access by an application contained in an application category having lower priority.

If the UE desires to use a power saving mode (PSM), the UE may set an active timer value of the TAU message and, based on this, determine whether to apply ACDC.

The term PSM may refer to a mode in which the UE sends data for a short time and then enters an idle state. Therefore, the UE that enters PSM may contribute to reduction in network congestion.

Therefore, in case the UE sets the active flag of the TAU message to 1 at step 1320, the UE may determine whether to set the active timer value of the TAU message for using PSM at step 1330.

If the active timer value is set, the UE may skip a congestion control through ACDC at step 1340. Therefore, at step 1350, the UE may transmit the TAU request message to the network according to a normal TAU procedure.

Namely, in case both the active flag and the active timer value are set, the UE may determine a call type corresponding to RRC establishment cause corresponding to the TAU message, form the RRC message including this information, and transmit the RRC message to the eNB.

In another example, if the TAU procedure is completed in a state where both the active flag and the active timer value are set (i.e., in case of transmitting the TAU request message to the eNB and then receiving the TAU accept message from the eNB), the UE may skip ACDC for other service request message until entering a PSM state after the expiration of an active timer.

Meanwhile, if the UE fails to set the active timer value of TAU at step 1330, the UE may apply ACDC to uplink data. Namely, the UE may find application information (e.g., application category) associated with the generation of uplink data at step 1370 and then determine access or not of UE according to the application information at step 1380. Details are discussed above in FIG. 11, so the repetition is omitted herein.

Meanwhile, if the UE does not set the active flag to 1 at step 1320, the UE may perform a normal TAU procedure at step 1390.

Namely, the UE may select a call type for the TAU message and RRC establishment cause without application category mapping, form the RRC message having such information, and transmit the RRC message to the eNB.

Figure 14:
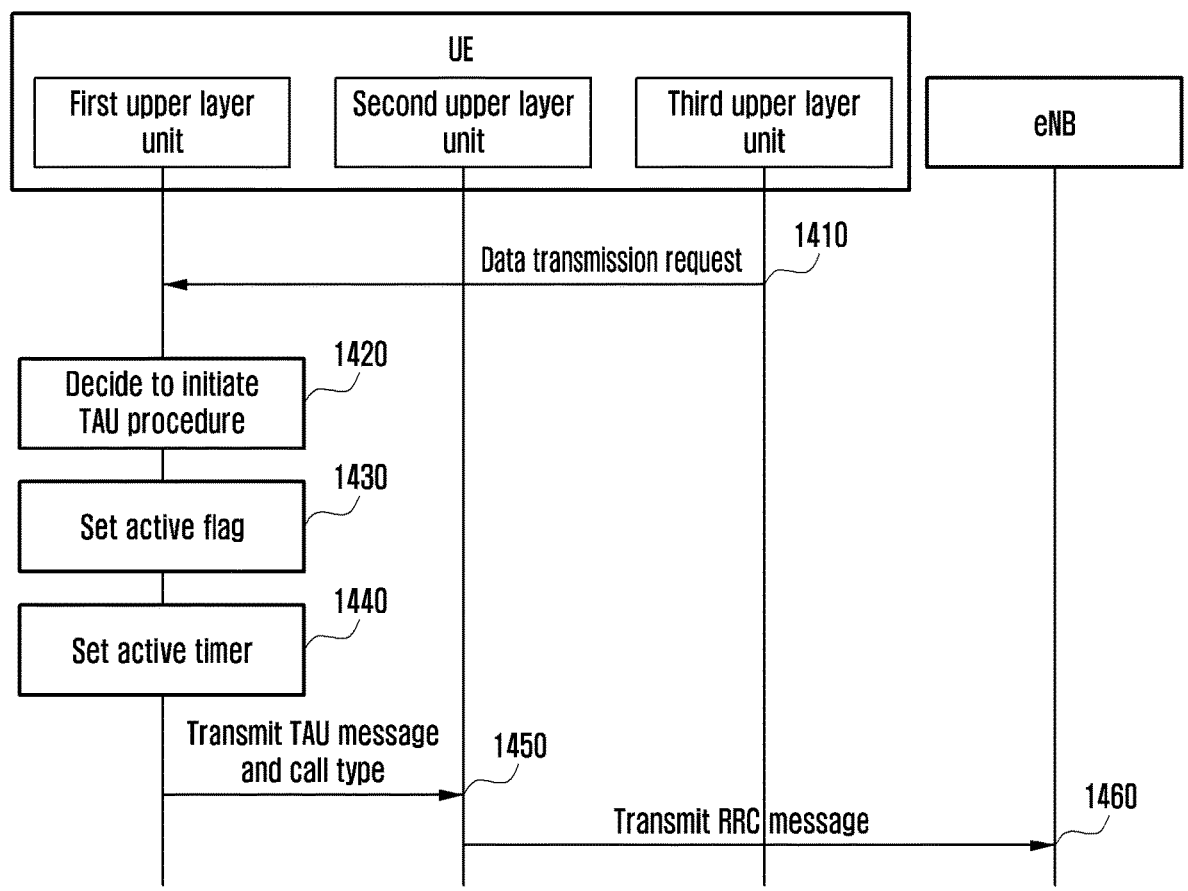
FIG. 14 is a flow diagram illustrating another process of applying ACDC in a TAU procedure according to the second embodiment of the present invention.

FIG. 14 is a flow diagram illustrating another process of applying ACDC in a TAU procedure according to the second embodiment of the present invention.

While FIG. 12 shows a case in which an active timer is not set, FIG. 14 shows a case in which the active timer is set.

Referring to FIG. 14, the first upper layer unit of the UE may receive a data transmission request from the third upper layer unit at step 1410. Then the first upper layer unit may decide to initiate a TAU procedure at step 1420. Alternatively, the first upper layer unit may decide to initiate the TAU procedure and then receive the data transmission request from the third upper layer unit.

Herein, the first upper layer unit may mean an apparatus for controlling operations on an NAS layer. Also, the third upper layer unit may mean an apparatus for controlling operations on an application layer.

When the UE initiates the TAU procedure, the UE may have uplink data to be transmitted through a network.

If the UE supports ACDC, if user plane radio resource allocation according to uplink data is requested, and if it is possible to apply ACDC to this request, the UE may set the active flag of the TAU message to 1 at step 1430. Additionally, at step 1440, the UE may set the active timer of the TAU message.

The case where the UE sets the active timer of the TAU message may mean a case in which the UE uses PSM. The term PSM may refer to a mode in which the UE sends data for a short time and then enters an idle state. Therefore, the UE that enters PSM may contribute to reduction in network congestion.

Therefore, if the UE sets the active flag to 1 because of the presence of uplink data to be transmitted, and if the UE sets the active timer value for the use of PSM, the UE may not require a congestion control through ACDC.

Therefore, at step 1450, the first upper layer unit may determine a call type corresponding to RRC establishment cause corresponding to the TAU message, and transmit this information to the second upper layer unit. At this time, the second upper layer unit may mean, but not limited to, an apparatus for controlling operations on the RRC layer.

Thereafter, the second upper layer unit may form the RRC message having the above information at step 1460, and transmit the RRC message to the eNB at step 1470.

Meanwhile, if the TAU procedure is completed in a state where both the active flag and the active timer value are set (i.e., in case of transmitting the TAU request message to the eNB and then receiving the TAU accept message from the eNB), the UE may skip ACDC for other service request message until entering a PSM state after the expiration of an active timer. If the first upper layer unit of the UE does not set the active flag to 1, the first upper layer unit may determine a call type corresponding to the TAU message and RRC establishment cause without application category mapping for using ACDC according to a normal TAU procedure, and transmit this to the second upper layer unit. Then the second upper layer unit may form the RRC message having the above information and transmit the RRC message to the eNB.

Figure 15:
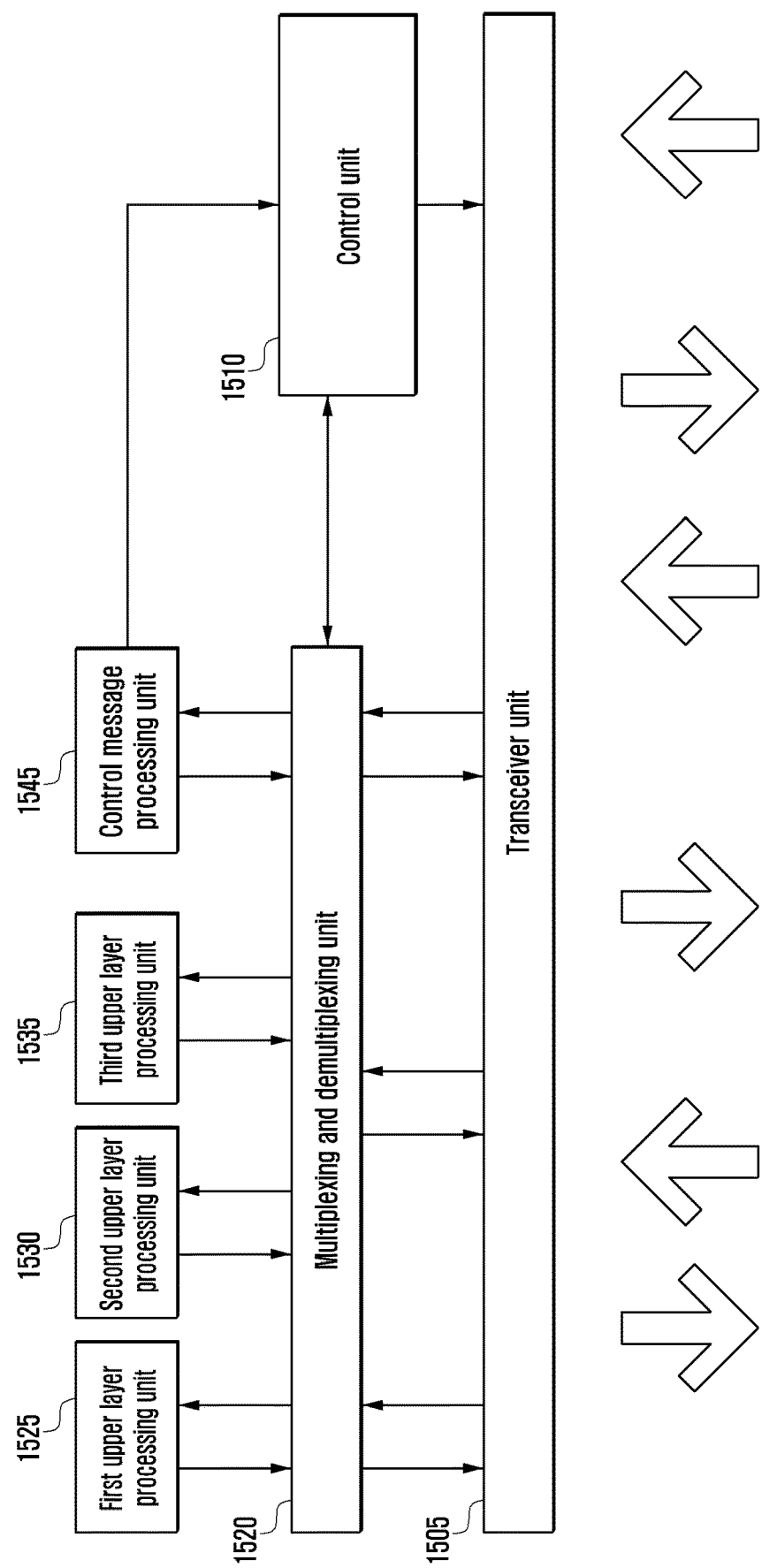
FIG. 15 is a block diagram illustrating a configuration of UE according to the second embodiment of the present invention.

FIG. 15 is a block diagram illustrating a configuration of UE according to the second embodiment of the present invention.

Referring to FIG. 15, the UE according to the second embodiment includes a transceiver unit 1505, a control unit 1510, a multiplexing and demultiplexing unit 1520, a control message processing unit 1545, and various upper layer processing units 1525, 1530 and 1535. Although three upper layer processing units 1525, 1530 and 1535 are shown, this is exemplary only and not to be considered as a limitation of this invention.

The transceiver unit 1505 may perform communication with other network entities. The transceiver unit 1505 may receive data and control signals through a downlink channel of a serving cell and also transmit data and control signals through an uplink channel.

The multiplexing and demultiplexing unit 1520 may multiplex data generated at the upper layer processing units 1525, 1530 and 1535 or the control message processing unit 1545. Also, the multiplexing and demultiplexing unit 1520 may demultiplex data received from the transceiver unit 1505 and then deliver it to the upper layer processing units 1525, 1530 and 1535 or the control message processing unit 1545.

The control message processing unit 1545 is a kind of RRC layer apparatus and may process a control message received from the eNB.

The upper layer processing units 1525, 1530 and 1535 may be formed of the first upper layer processing unit 1525, the second upper layer processing unit 1530, and the third upper layer processing unit 1535. The UE may further include a plurality of upper layer processing units.

The first upper layer processing unit 1525 may control operations on the NAS layer, and the second upper layer processing unit 1530 may control operations on the RRC layer. Also, the third upper layer processing unit 1535 may control operations on the application layer. Such upper layer processing units may be formed for each service. The upper layer processing units may process data created in a user service such as FTP (File Transfer Protocol) or VoIP (Voice over Internet Protocol) and then deliver it to the multiplexing and demultiplexing unit 1520, or may process data delivered from the multiplexing and demultiplexing unit 1520 and then deliver it to a service application on the upper layer.

The control unit 1510 may check scheduling commands, e.g., reverse grants, received through the transceiver unit 1505 and then control the transceiver unit 1505 and the multiplexing and demultiplexing unit 1520 so that reverse transmission can be performed with suitable transmission resources at a suitable time point. Also, the control unit 1510 controls all procedures applying ACDC in the TAU procedure. Namely, the control unit 1510 performs control operations associated with the operation of UE as shown in FIGS. 11 to 14.

Specifically, the control unit 1510 may control the first upper layer processing unit to determine whether to initiate the TAU procedure. At this time, if uplink data transmission is requested through the third upper layer processing unit, the control unit 1510 may control the first upper layer processing unit to determine whether to initiate the TAU procedure. Alternatively or additionally, the control unit 1510 may control the reception of a data transmission request from the third upper layer processing unit after the first upper layer processing unit determines the initiation of the TAU procedure. Also, the control unit 1510 may control a value of the active flag to be set to 1, depending on whether there is transmission-ready uplink data. If the value of the active flag is not set to 1, the control unit 1510 may control performing a normal TAU procedure. If the value of the active flag is set to 1, the control unit 1510 may control determining application information of an application from which transmission-ready uplink data is generated. This application information may include an application category. Additionally, the control unit 1510 may control delivering the application information from the first upper layer processing unit to the second upper layer processing unit. Also, the control unit 1510 may determine whether to allow the access of UE, using the application information through the second upper layer processing unit. The control unit 1510 may extract a barring factor corresponding to an application category from SIB information received from the eNB. The control unit 1510 may determine UE access barring or passing, depending on a value specified or created through random number generation using the barring factor.

However, even in case of access barring due to lower priority of a specific application category, the control unit 1510 may perform the access procedure if the UE supports ACDC when radio resources of a user plane is requested for an application category having higher priority.

If the access of UE is passed, the control unit 1510 may control transmitting the RRC message having the TAU message to the eNB through the second upper layer processing unit.

Meanwhile, with regard to UE that uses PSM, the control unit 1510 may control determining whether to apply ACDC. The term PSM may refer to a mode in which the UE sends data for a short time and then enters an idle state. Therefore, the UE that enters PSM may contribute to reduction in network congestion.

Therefore, in case of setting the active flag to 1 (i.e., transmission-ready uplink data exists) and in case of setting the active timer value so as to operate in PSM, the control unit 1510 may control performing no congestion control through ACDC. Therefore, the control unit 1510 may control performing a normal TAU procedure. Specifically, the control unit 1510 may control the first upper layer processing unit to determine a call type corresponding to RRC establishment cause corresponding to the TAU message, and transmit this information to the second upper layer processing unit. Further, the control unit 1510 may control the second upper layer processing unit to form the RRC message having the above information and transmit the RRC message to the eNB.

Meanwhile, if the TAU procedure is completed in a state where both the active flag and the active timer value are set (i.e., in case of transmitting the TAU request message to the eNB and then receiving the TAU accept message from the eNB), the control unit 1510 may skip ACDC for other service request message until entering a PSM state after the expiration of an active timer.

Third Embodiment

Hereinafter, a method and apparatus for providing a multimedia broadcast multicast service (MBMS) according to the third embodiment of the present invention will be described.

In case of providing data to UE through MBMS, a group communication service application server (GCS AS) and/or a broadcast/multicast service center (BM-SC) may transmit information associated with MBMS service area, and the UE may receive MBMS data based on the MBMS service area. However, since the MBMS service area covers a wide range, MME may change the MBMS service area even when considerable traffic is generated due to numerous users in a specific area. Therefore, in case there are many users in a specific area, the MME may transmit a message for instructing a setup or modification of MBMS session to a multi cell/multicast coordination entity (MCE) contained in the MBMS service area so that the MBMS session can be created or changed and finally MBMS data can be transmitted to the UE. However, this method for creating or changing the MBMS session may invite necessary signaling. Therefore, this invention proposes a method for transmitting and receiving data in a smaller MBMS area than the MBMS service area.

Figure 16B:
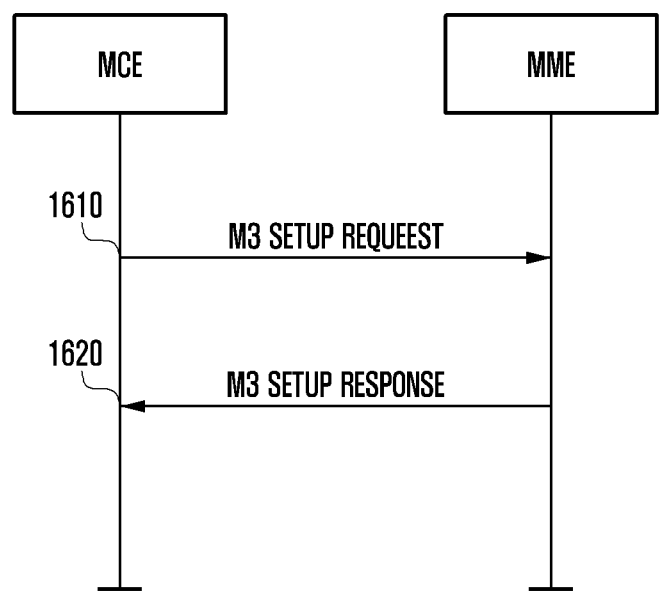

FIGS. 16A and 16B are flow diagrams illustrating a method for providing an MBMS service according to the third embodiment of the present invention.

In this embodiment, an MBMS applicable area may be a smaller area than the MBMS service area.

Referring to FIG. 16A, the GCS AS may transmit an activate MBMS bearer request message to the BM-SC at step 1601. Alternatively, the GCS AS may transmit a modify MBMS bearer request message for modifying an activated MBMS bearer to the BM-SC at step 1604. The activate MBMS bearer request message and the modify MBMS bearer request message may contain information about an MBMS broadcast area. The GCS AS may determine the MBMS broadcast area information, based on information (e.g., a UE location which may be represented as a cell identifier, an MBSFN area identifier, an MBMS service area, etc.) obtained from the UE through application signaling and/or setting information. The MBMS broadcast area information may include an MBMS service area, an MBSFN area identifier list, and/or a cell list (i.e., an ECGI (E-UTRAN cell global identifier) list).

At step 1602, the BM-SC that receives the activate MBMS bearer request message may allocate resources in an MBMS system so as to support a data flow. Alternatively, at step 1605, the BM-SC that receives the modify MBMS bearer request message may determine whether to modify the MBMS bearer.

If a cell list is contained in the MBMS broadcast area information received by the BM-SC, the BM-SC may induce the MBMS service area from the cell list information. For this, the BM-SC may have mapping information between the cell list information and the MBMS service area. In this case, if the MBMS service area is received from the GCS AS, the BM-SC may overwrite the received MBMS service area with the induced MBMS service area. Thereafter, the BM-SC may insert mapped MBMS service area and/or cell list in a message sent to MBMS GW for requesting MBMS bearer activation and/or MBMS bearer modification. Of course, even though a cell list is contained in the MBMS broadcast area information received by the BM-SC, the MBMS service area information received from the GCS AS may be used as it is. In case the GCS AS sends the cell list and the MBMS service area, whether the BM-SC will use them as received or use a new MBMS service area induced from the cell list may depend on an operator's policy and/or setting.

If the BM-SC induces the MBMS service area from the cell list, the BM-SC may deliver, to the GCS AS, the induced MBMS service area (i.e., the MBMS service area contained in a message sent to the MBMS GW for requesting MBMS bearer activation and/or MBMS bearer modification) through a response message for the request of MBMS bearer activation and/or MBMS bearer modification at step 1603 or 1606. If the BM-SC does not induce the MBMS service area from the cell list, or if the received MBMS broadcast area information does not contain the cell list, the BM-SC may not insert the MBMS service area in the response message for the request of MBMS bearer activation and/or MBMS bearer modification.

The GCS AS may transmit, to the UE, the MBMS service area received at step 1603 or 1606. If the GCS AS fails to receive the MBMS service area at step 1603 or 1606, the GCS AS may transmit, to the UE, the MBMS service area transmitted to the BM-SC at step 1601 or 1604. Although any cell is located in the MBMS service area, MBMS may not be applied if the MBMS bearer is activated using the cell list. Therefore, in case the MBMS service area received from the GCS AS is not contained in the MBMS service area information broadcasted by the cell, the UE can know that MBMS is not applied to a service in that cell. However, in case the MBMS service area received from the GCS AS is contained in the MBMS service area information broadcasted by the cell, the UE may not know whether MBMS is applied or not to a service in that cell.

Referring to FIG. 16B, the MME may receive, from MBMS-GW, a message that contains the MBMS service area and the cell list (i.e., the ECGI list). Also, a message transmitted to the MCE by the MME may contain parameters received through the BM-SC by the MBMS-GW. In this case, these parameters may include a temporary mobile group identity (TMGI), FlowID, QoS, MBMS broadcast area information, a start time, and the like. The MBMS broadcasts area information may include the MBMS service area or the cell list information. If the cell list information is contained in the MBMS broadcast area information, this information may be mapped to the MBMS service area by the BM-SC. The BM-SC may deliver, to the GCS AS, information (MBMS service area) created from the cell list information.

The MME that receives the message including the MBMS service area and the cell list from the MBMS GW may transmit a message (hereinafter, referred to as an MBMS session setup or modify message) for a setup or modification of MBMS session to the MCE. At this time, the MME may send the MBMS session setup or modify message to only the MCE that controls the received cell list.

For this, at step 1610 for M3 setup with the MME, the MCE may deliver, to the MME, an M3 setup request message having a cell identifier list and/or an identifier list of the eNB connected to the MCE.

The M3 setup request message may be defined as shown in Table 2 and Table 3.

TABLE 2

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Global MCE ID | M | | 9.2.1.10 | | YES | reject |

TABLE 2-continued

| IE/Group Name | Presence | Range | IE type and reference | Semantics description | Criticality | Assigned Criticality |
|---|---|---|---|---|---|---|
| MCE Name | O | | PrintableString(1 . . . 150, . . . ) | | YES | ignore |
| MBMS Service Area List | | 1 | | | YES | reject |
| >MBMS Service Area List Item | | 1 to <maxnoofMBMSServiceAreaIdentitiesPerMCE> | | Supported MBMS Service Area Identities in the MCE | GLOBAL | reject |
| >>MBMS Service Area 1 | M | | OCTET STRING(2) | MBMS Service Area Identities as defined in TS 23.003 [13]. | | |
| eNB list or cell list | | 1 to n | | | | |
| > Global eNB ID or ECGI | | | | | | |

TABLE 3

| Range bound | Explanation |
|---|---|
| maxnoofMBMSServiceAreaIdentitiesPerMCE | Maximum no. of Service Area Identities per MCE. The value for maxnoofMBMSServiceAreaIdentities is 65536. |

At step 1620, the MME that receives the above-message may transmit an M3 setup response message for the setup request message.

At this time, the MME may identify the eNB by using a global eNB ID part of the cell list information (ECGI) and also check serving MCE information for each eNB contained in the setup request message. Therefore, the MME can determine the MCE to which the MBMS session setup or modify message will be transmitted. In this manner, the MME may send the MBMS session setup or modify message to a few of MCEs, thus effecting a reduction in signaling.

Meanwhile, the MME may receive, from the eNB, an S1 setup request message or eNB configuration update request message which contains an identifier of MCE connected to the eNB or a cell in the eNB. Therefore, in similar manner using similar information as discussed above, the MME may determine the MCE to which the MBMS configuration message will be transmitted.

Figure 17:
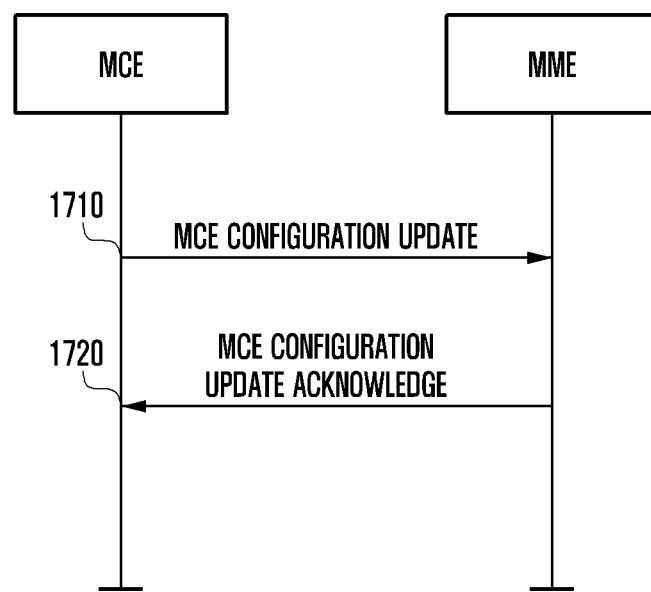
FIG. 17 is another flow diagram illustrating a method for providing an MBMS service according to the third embodiment of the present invention.

FIG. 17 is another flow diagram illustrating a method for providing an MBMS service according to the third embodiment of the present invention.

Referring to FIG. 17, the MME may receive, from MBMS-GW, a message that contains the MBMS service area and the cell list (i.e., the ECGI list). Details are discussed earlier in FIG. 16B, so the repetition is omitted herein.

The MME that receives the message including the MBMS service area and the cell list from the MBMS GW may transmit the MBMS session setup or modify message to the MCE. At this time, the MME may send the MBMS session setup or modify message to only the MCE that controls the received cell list.

For this, at step 1710, the MCE may deliver, to the MME, an MCE configuration update message having a cell identifier list and/or an identifier list of the eNB connected to the MCE.

The MCE configuration update message may be defined as shown in Table 4 and Table 5.

TABLE 4

| IE/Group Name | Presence | Range | IE type and reference | Semantics description | Criticality | Assigned Criticality |
|---|---|---|---|---|---|---|
| Message Type | M | | 9.2.1.1 | | YES | reject |
| Global MCE ID | O | | 9.2.1.10 | | YES | reject |
| MCE Name | O | | PrintableString(1 . . . 150, . . . ) | | YES | ignore |

TABLE 4-continued

| IE/Group Name | Presence | Range | IE type and reference | Semantics description | Criticality | Assigned Criticality |
|---|---|---|---|---|---|---|
| MBMS Service Area List | | 0..1 | | | YES | reject |
| >MBMS Service Area List Item | | 1 to <maxnoof MBMSSer viceAreaI dentitiesP erMCE> | | Supported MBMS Service Area Identities in the MCE | GLOBAL | reject |
| >>MBMS Service Area 1 | M | | OCTET STRING(2) | MBMS Service Area Identities as defined in TS 23.003 [13]. | | |
| eNB list or cell list | | 1 to n | | | | |
| > Global eNB ID or ECGI | | | | | | |

TABLE 5

| Range bound | Explanation |
|---|---|
| maxnoofMBMSServiceAreaIdentitiesPerMCE | Maximum no. of Service Area Identities per MCE. The value for maxnoofMBMSServiceAreaIdentities is 65536. |

At step 1720, the MME that receives the above-message may transmit an MCE configuration update acknowledge message.

At this time, the MME may identify the eNB by using a global eNB ID part of the cell list information (ECGI) and also check serving MCE information for each eNB contained in the MCE configuration update message. In this manner, the MME may send the MBMS session setup or modify message to a few of MCEs, thus effecting a reduction in signaling.

Figure 18:
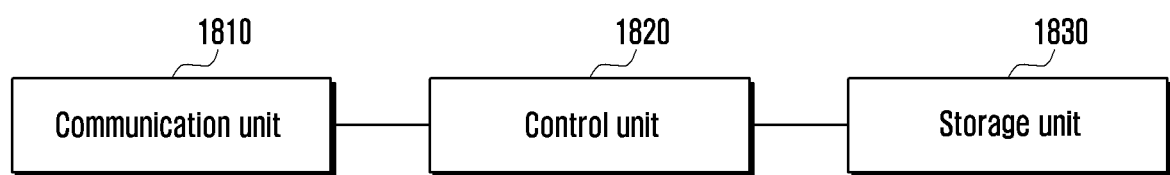
FIG. 18 is a block diagram illustrating a configuration of MME according to the third embodiment of the present invention.

FIG. 18 is a block diagram illustrating a configuration of MME according to the third embodiment of the present invention.

Referring to FIG. 18, the MME may be formed of a communication unit 1810, a control unit 1820, and a storage unit 1830.

The communication unit 1810 may perform communication with other network entities such as the MBMS GW, the MCE, the eNB, or the like.

The control unit 1820 may control the reception of a message having the MBMS service area and the cell list from the MBMS GW. This message may contain parameters received through the BM-SC by the MBMS-GW. In this case, these parameters may include TMGI, FlowID, QoS, MBMS broadcast area information, a start time, and the like. Details are discussed earlier in FIG. 16, so the repetition is omitted herein.

The control unit 1820 may control the reception of an M3 setup request message from the MCE at M3 setup with the MCE. The M3 setup request message may have a cell identifier list and/or an identifier list of the eNB connected to the MCE. The control unit 1820 may control the transmission of a setup response message for the setup request message.

Additionally, the control unit 1820 may identify the eNB by using a global eNB ID part of the cell list information (ECGI) and also check serving MCE information for each eNB contained in the setup request message. Therefore, the control unit 1820 can determine the MCE to which the MBMS session setup or modify message will be transmitted.

Meanwhile, a cell identifier list and/or an identifier list of the eNB may be contained in the MCE configuration update message and transmitted to the MME from the MCE.

Additionally, the control unit 1820 may control the reception, from the eNB, of the S1 setup request message or eNB configuration update request message having an identifier of MCE connected to the eNB or a cell in the eNB. Using the above information, the control unit 1820 may determine the MCE to which the MBMS session setup or modify message will be transmitted. This method is discussed above.

The storage unit 1830 may store information received from the MBMS GW. Also, the storage unit 1830 may store information received from the MCE or the eNB. Therefore, such information stored in the storage unit 1830 may be used for determining the MCE to which the MBMS session setup or modify message will be transmitted.

Further, the storage unit 1830 may store a list of MCE determined to transmit the MBMS session setup or modify message.

Figure 19:
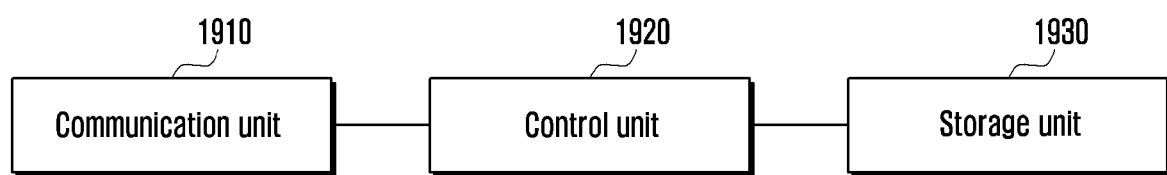
FIG. 19 is a block diagram illustrating a configuration of MCE according to the third embodiment of the present invention.

FIG. 19 is a block diagram illustrating a configuration of MCE according to the third embodiment of the present invention.

Referring to FIG. 19, the MCE may be formed of a communication unit 1910, a control unit 1920, and a storage unit 1930.

The communication unit 1910 may perform communication with other network entities such as the MME, the eNB, or the like.

The control unit 1920 may control the transmission of the M3 setup request message to the MME for M3 setup with the MME. The control unit 1920 may insert, in the M3 setup request message, a cell identifier list and/or an identifier list of the eNB connected to the MCE. Also, the control unit 1930 may control the reception of the setup response message for the setup request message.

Additionally, the control unit 1920 may control the transmission, to the MME, of the M3 setup request message having a cell identifier list and/or an identifier list of the eNB connected to the MCE, and also control the reception of the MCE configuration update acknowledge message.

Further, the control unit 1920 may control the reception of the MBMS session setup or modify message from the MME in case the MCE is selected by the MME.

The storage unit 1930 may store a cell identifier list and/or an identifier list of the eNB connected to the MCE. Therefore, such information stored in the storage unit 1930 may be used for creating the M3 setup request message or the MCE configuration update message.

The present invention may be embodied in many different forms without changing technical subject matters and essential features as will be understood by those skilled in the art. Therefore, embodiments set forth herein are exemplary only and not to be construed as a limitation.

In embodiments, all steps and messages are not a target for selective implementation or omission. Additionally, in each embodiment, steps may not be always performed in the order described and may be changed in order. Similarly, delivery of messages may not be always performed in the order described and may be changed in order. Each step and messaging may be performed independently.

The whole or parts of exemplary contents in embodiments are provided to promote understanding by showing a detailed embodiment of this invention. Therefore, the detailed contents may be regarded as expressing a part of method and apparatus proposed by this invention. Namely, with regard to such contents, a syntax-based approach may be more desirable than a semantics-based approach.

While the present invention has been particularly shown and described with reference to an exemplary embodiment thereof, it will be understood by those skilled in the art that various changes in form and details may be made therein without departing from the spirit and scope of the invention as defined by the appended claims.

What is claimed is:

1. A method performed by a terminal in a wireless communication system, the method comprising:
    identifying, by a first layer of the terminal, to initiate a tracking area update (TAU) procedure;
    identifying, by the first layer, an application specific congestion control for data communication (ACDC) category associated with uplink data;
    delivering, by the first layer, the ACDC category to a second layer of the terminal;
    determining, by the second layer, whether an access for the uplink data is barred based on the ACDC category; and
    performing the TAU procedure in case that the access for the ACDC category associated with the uplink data is barred and a user plane radio resource for a higher ACDC category than the ACDC category is requested.

2. The method of claim 1, wherein the TAU procedure is started in case that the terminal supports ACDC.

3. The method of claim 2, wherein the ACDC category is identified based on an application identifier for the request and configuration information in an ACDC management object (MO).

4. The method of claim 1, wherein an active flag in a TAU message is configured to 1, in case that a user plane radio resource is requested for the uplink data.

5. The method of claim 1, wherein a radio resource control (RRC) establishment case and a call type is delivered from the first layer to the second layer.

6. The method of claim 1, wherein information on the ACDC category includes bit information.

7. A terminal in a wireless communication system, the terminal comprising:
    a transceiver; and
    a controller configured to:
        control a first layer of the terminal to identify to initiate a tracking area update (TAU) procedure,
        identify an application specific congestion control for data communication (ACDC) category associated with uplink data,
        deliver the ACDC category to a second layer of the terminal,
        control the second layer to determine whether an access for the uplink data is barred based on the ACDC category, and
        perform the TAU procedure in case that the access for the ACDC category associated with the uplink data is barred and a user plane radio resource for a higher ACDC category than the ACDC category is requested.

8. The terminal of claim 7, wherein the TAU procedure is started in case that the terminal supports ACDC.

9. The terminal of claim 8, wherein the ACDC category is identified based on an application identifier for the request and configuration information in an ACDC management object (MO).

10. The terminal of claim 7, wherein an active flag in a TAU message is configured to 1, in case that a user plane radio resource is requested for the uplink data.

11. The terminal of claim 7, wherein a radio resource control (RRC) establishment case and a call type is delivered from the first layer to the second layer.

12. The terminal of claim 7, wherein information on the ACDC category includes bit information.

* * * * *